(12) United States Patent
Tsuchimoto et al.

(10) Patent No.: US 10,116,250 B2
(45) Date of Patent: Oct. 30, 2018

(54) AC-ROTARY-MACHINE CONTROL DEVICE AND ELECTRIC POWER-STEERING SYSTEM PROVIDED WITH AC-ROTARY-MACHINE CONTROL DEVICE

(71) Applicant: Mitsubishi Electric Corporation, Tokyo (JP)

(72) Inventors: Yuya Tsuchimoto, Tokyo (JP); Isao Kezobo, Tokyo (JP); Yoshihiko Kimpara, Tokyo (JP); Shunsuke Nakajima, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 35 days.

(21) Appl. No.: 15/307,204

(22) PCT Filed: Jun. 16, 2014

(86) PCT No.: PCT/JP2014/065911
§ 371 (c)(1),
(2) Date: Oct. 27, 2016

(87) PCT Pub. No.: WO2015/193948
PCT Pub. Date: Dec. 23, 2015

(65) Prior Publication Data
US 2017/0047883 A1  Feb. 16, 2017

(51) Int. Cl.
*H02P 29/64* (2016.01)
*H02P 6/14* (2016.01)
(Continued)

(52) U.S. Cl.
CPC ............... *H02P 29/64* (2016.02); *H02P 6/14* (2013.01); *H02P 21/13* (2013.01); *H02P 21/14* (2013.01); *H02P 27/06* (2013.01)

(58) Field of Classification Search
CPC .......... H02P 29/64; H02P 29/60; H02P 29/66; H02P 29/68
See application file for complete search history.

(56) References Cited

U.S. PATENT DOCUMENTS

| | | | |
|---|---|---|---|
| 2003/0076064 A1* | 4/2003 | Kleinau | B62D 5/0481 318/567 |
| 2007/0132446 A1* | 6/2007 | Kleinau | B60L 15/025 324/160 |
| 2015/0381090 A1* | 12/2015 | Henderson | H02P 6/183 318/400.33 |

FOREIGN PATENT DOCUMENTS

| | | |
|---|---|---|
| EP | 1 755 211 A1 | 2/2007 |
| EP | 2 487 089 A2 | 8/2012 |
| | (Continued) | |

OTHER PUBLICATIONS

International Search Report of PCT/JP2014/065911, dated Sep. 9, 2014. [PCT/ISA/210].

(Continued)

*Primary Examiner* — Bickey Dhakal
(74) *Attorney, Agent, or Firm* — Sughrue Mion, PLLC; Richard C. Turner

(57) ABSTRACT

When there is an error between an actual resistance value of an AC rotary machine (ACRM) and an estimated resistance value estimated from a detected external temperature of the ACRM, the ACRM cannot be rotated smoothly. In view of this, provided are a control device for an ACRM and the like, including a resistance value estimation unit (10) configured to calculate an estimated resistance value (Rest) by adding to a basic estimated resistance value (Rest0), which is a value obtained by estimating a resistance value from a detected external temperature of the ACRM, an estimated resistance correction value (Radd), which is determined such that a range that can be taken by an error (ΔR) of the (Continued)

resistance value estimated in advance falls within a range of the error of the resistance value that enables the ACRM to be rotated smoothly.

20 Claims, 16 Drawing Sheets

(51) Int. Cl.
  *H02P 27/06* (2006.01)
  *H02P 21/13* (2006.01)
  *H02P 21/14* (2016.01)

(56) References Cited

FOREIGN PATENT DOCUMENTS

| JP | 3104865 | B2 | 10/2000 |
|----|---------|----|---------|
| JP | 2002-252995 | A | 9/2002 |
| JP | 2007-302177 | A | 11/2007 |
| JP | 2008-067570 | A | 3/2008 |
| JP | 4672236 | B2 | 4/2011 |
| JP | 2012-165547 | A | 8/2012 |
| JP | 5211618 | B2 | 6/2013 |

OTHER PUBLICATIONS

Communication dated Dec. 19, 2017 from the European Patent Office in counterpart application No. 14895284.9.

Visinka, "Phase Resistance Estimation for Sensorless Control of Switched Reluctance Motors", IECON—2002, Proceedings of the 28th Annual Conference of the IEEE Industrial Electronics Society, IEEE, vol. 2, Nov. 2002, pp. 1044-1049.

Ha et al., "An Online Identification Method for Both Stator and Rotor Resistances of Induction Motors Without Rotational Transducers", IEEE Transactions on Industrial Electronics, vol. 47, No. 4, Aug. 2000, pp. 842-853.

* cited by examiner

AC-ROTARY-MACHINE CONTROL DEVICE AND ELECTRIC POWER-STEERING SYSTEM PROVIDED WITH AC-ROTARY-MACHINE CONTROL DEVICE

CROSS REFERENCE TO RELATED APPLICATIONS

This application is a National Stage of International Application No. PCT/JP2014/065911 filed Jun. 16, 2014, the contents of all of which are incorporated herein by reference in their entirety.

TECHNICAL FIELD

The present invention relates to a control device for an AC rotary machine, which is configured to estimate a resistance value of winding of an AC rotary machine, and to an electric power steering system including the control device for an AC rotary machine.

BACKGROUND ART

As a related-art control device for an AC rotary machine, as disclosed in Patent Literature 1 and Patent Literature 2, there is known a control device configured to perform sensor-less control by estimating a velocity and a position of a rotor based on a resistance value of winding and using those estimated values instead of signals detected by a position sensor and a velocity sensor.

Further, as another invention, as disclosed in Patent Literature 3, there is known a control device configured to accurately estimate the resistance value of winding, which changes depending on temperature, with use of an external temperature of the AC rotary machine and a current value of an armature.

CITATION LIST

Patent Literature

[PTL 1] JP 3104865 B2
[PTL 2] JP 4672236 B2
[PTL 3] JP 5211618 B2
[PTL 4] JP 2734606 B2
[PTL 5] JP 07-107781 A

SUMMARY OF INVENTION

Technical Problem

There is a problem in a control device for an AC rotary machine, which is configured to use a model resistance value for control obtained by setting the resistance value of an AC rotary machine to be controlled as a parameter of a model to be controlled, and in an electric power steering system including the control device for an AC rotary machine. Specifically, an actual resistance value of the AC rotary machine changes depending on change in temperature of winding of the AC rotary machine, and this change causes a resistance value error, which is an error between the actual resistance value and the resistance value set as the parameter of the model to be controlled (hereinafter referred to as "model resistance value"), with the result that the AC rotary machine cannot be rotated smoothly. For example, when the velocity and position are estimated based on the model resistance value as described in Patent Literature 2, estimation errors of an estimated velocity and an estimated position are caused due to the resistance value error, and an increase in vibration and fixation of the position of the AC rotary machine are caused.

Regarding the effect of the resistance value error that is caused depending on temperature as described above, in Patent Literature 3, the resistance value can be accurately estimated with use of an external temperature of the AC rotary machine even when the temperature changes, and thus the AC rotary machine can be rotated smoothly by using the estimated resistance value as the model resistance value in Patent Literature 1 and Patent Literature 2. However, the estimated resistance value is calculated by transforming the external temperature of the AC rotary machine into the temperature of the AC rotary machine, and thus a temperature model that uses, for example, a current value to obtain the transformed temperature of the AC rotary machine is required. This complicates the method of estimating the resistance value.

The present invention has been made to solve the above-mentioned problems, and has an object to provide a control device for an AC rotary machine and the like, which are capable of rotating the AC rotary machine smoothly with a simpler method.

Solution to Problem

According to one embodiment of the present invention, there are provided a control device for an AC rotary machine and the like, the control device being configured to control the AC rotary machine based on an estimated resistance value of the AC rotary machine, the control device including: a temperature detection unit configured to detect an external temperature of the AC rotary machine, and to output the detected external temperature; and a resistance value estimation unit configured to estimate, based on the detected external temperature, an actual resistance value of the AC rotary machine, which changes depending on temperature of the AC rotary machine, and to output the estimated resistance value, in which the resistance value estimation unit is configured to calculate a basic estimated resistance value, which is a sum of a first resistance value defined as a fixed value and a second resistance value that is proportional to the detected external temperature, and to calculate the estimated resistance value by adding an estimated resistance correction value to the basic estimated resistance value, in which the estimated resistance correction value is a negative value having an absolute value that is larger than a difference between a lower limit value of a resistance value error allowable range and a deviation estimate, and is smaller than an absolute value of the deviation estimate, in which the deviation estimate is a value set in advance as a lower limit of a range that has a possibility of being taken by a deviation obtained by subtracting the basic estimated resistance value from the actual resistance value, and in which the resistance value error allowable range is a range of a resistance value error that enables the AC rotary machine to be rotated smoothly.

Further, there are provided a control device for an AC rotary machine and the like, the control device being configured to control the AC rotary machine based on an estimated resistance value of the AC rotary machine, the control device including: a temperature detection unit configured to detect an external temperature of the AC rotary machine, and to output the detected external temperature; and a resistance value estimation unit configured to estimate, based on the detected external temperature, an actual resistance value of the AC rotary machine, which changes depending on temperature of the AC rotary machine, and to output the estimated resistance value, in which the resistance value estimation unit is configured to calculate a basic estimated resistance value, which is a sum of a first resistance value defined as a fixed value and a second resistance value that is proportional to the detected external temperature, and to calculate the estimated resistance value by adding an estimated resistance correction value to the basic estimated resistance value, in which the estimated resistance correction value is a positive value having an absolute value that is larger than a difference between an upper limit value of a resistance value error allowable range and a deviation estimate, and is smaller than an absolute value of the deviation estimate, in which the deviation estimate is a value set in advance as an upper limit of a range that has a possibility of being taken by a deviation obtained by subtracting the basic estimated resistance value from the actual resistance value, and in which the resistance value error allowable range is a range of a resistance value error that enables the AC rotary machine to be rotated smoothly.

Advantageous Effects of Invention

According to the present invention, the control device for an AC rotary machine and the like, which are capable of rotating the AC rotary machine smoothly with a simpler configuration, can be provided.

DESCRIPTION OF EMBODIMENTS

Figure 11:
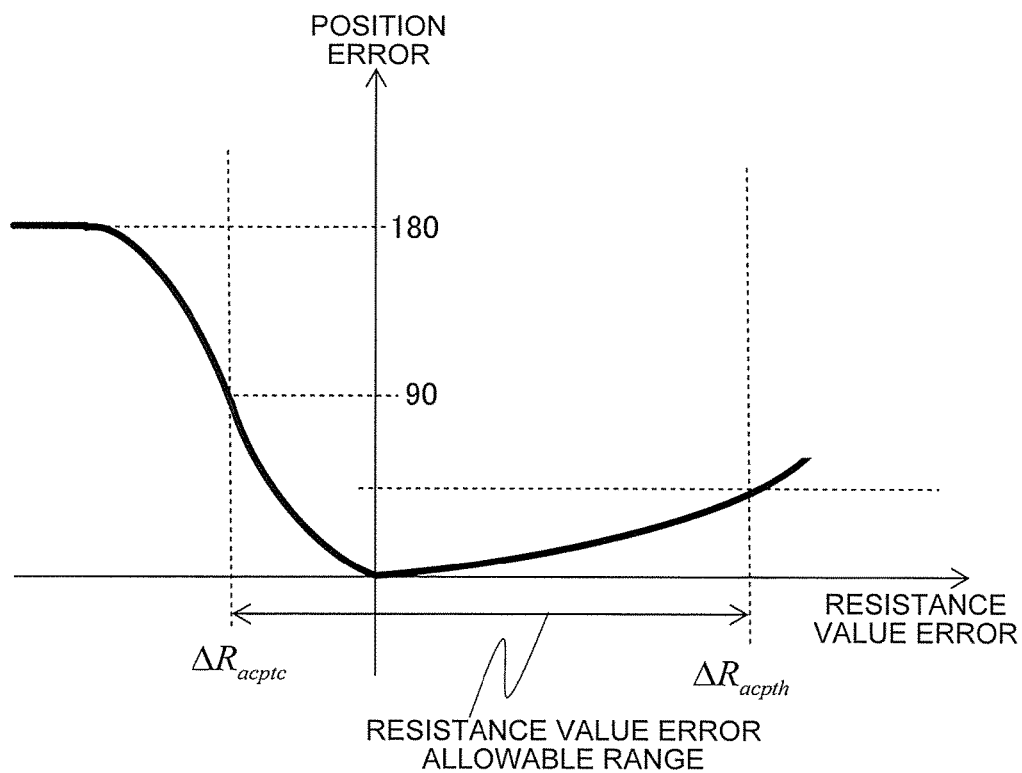
FIG. 11 is a graph for showing a relationship between the resistance value error and a position error in a method of estimating a velocity and a position based on an induced voltage.

First, with reference to FIG. 11, a description is given in detail of a related-art problem in that, when a velocity and a position are estimated based on a model resistance value, estimation errors of an estimated velocity and an estimated position are caused due to a resistance value error, and an increase in vibration and fixation of the position of an AC rotary machine are caused, with the result that the AC rotary machine cannot be rotated smoothly.

As represented by Math. 1 of Patent Literature 1, there is generally known a method of estimating a velocity with use of an induced voltage from a voltage equation of the AC rotary machine. In this kind of method, an estimated velocity w is calculated based on Expression (1), which is a variation of the voltage equation. In Expression (1), V, R, I, and φ represent a voltage, a model resistance value, a current, and an induced voltage constant, respectively. An estimated position th0 is obtained based on Expression (2), which integrates the estimated velocity w. Meanwhile, a method of estimating the velocity and position with use of an adaptive observer of Patent Literature 2 is also an estimation method that uses an induced voltage, and has the same estimation principle as that of Patent Literature 1. In Expression (1), the estimated velocity w is calculated based on the model resistance value R, and thus, when there is a resistance value error, a velocity error between an actual velocity and the estimated velocity w is caused, with the result that a position error of the estimated position th0, which is calculated by integrating the estimated velocity w, is also caused.

[Math. 1]

$$w=(V-RI)/\phi \qquad (1)$$

$$th0=\int wdt \qquad (2)$$

FIG. 11 is a graph for conceptually showing a relationship between a resistance value error $\Delta R$ and a smoothed absolute value of a position error $\Delta \theta$ in the method of estimating the velocity and position based on the induced voltage, which is referred to as "basic characteristic with respect to position error". The resistance value error is defined as a value obtained by subtracting the model resistance value from the actual resistance value, and a range that can be taken by the resistance value error, which is a range that can be taken by the value of this resistance value error, is between a lower limit $\Delta Rerrc$ and $\Delta Rerrh$. Further, a resistance value error allowable range of FIG. 11 described later is between a lower limit $\Delta Racptc$ and an upper limit $\Delta Racpth$.

When the resistance value error is negative, an increase in position error to or above 90 deg causes fixation of the position of the AC rotary machine, and the AC rotary machine cannot be rotated. On the other hand, when the resistance value error is positive, the smoothed absolute value of the position error is small compared to the case in which the resistance value error is negative, but an instantaneous position error is large enough to cause an oscillating response. This issue is now described with use of Expressions (1) and (2).

Figure 12:
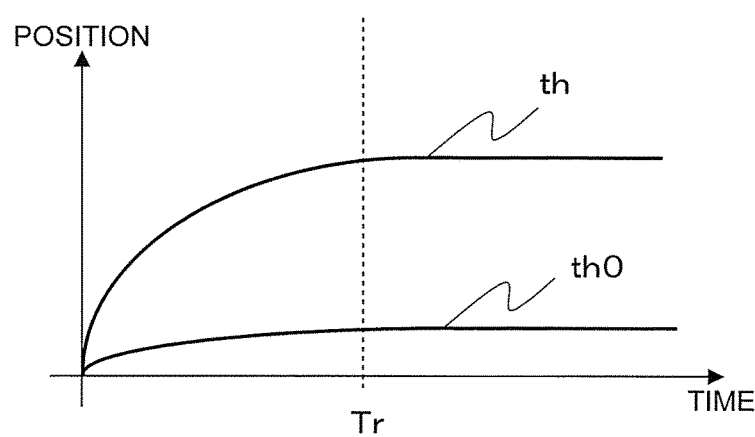
FIG. 12 is a graph for showing an influence of a case in which the error of the resistance value is negative.

First, a description is given of a case in which the resistance value error is negative, that is, a case in which the model resistance value is larger than the actual resistance value. The negative resistance value error is referred to as "negative direction error". FIG. 12 is a graph for showing time responses of an actual position th and the estimated position th0 of the AC rotary machine when the resistance value error is a negative direction error. In FIG. 12, the position error, which is a difference between the actual position th and the estimated position th0 of the AC rotary machine, is equal to or larger than 90 deg on and after a time Tr. This indicates a state in which the position of the AC rotary machine is fixed.

Based on Expression (1), when the model resistance value R is large, the RI term takes a large value, with the result that the estimated velocity is calculated to be a value smaller than the actual velocity. Based on Expression (2), a small estimated velocity means a small increase amount of the estimated position, and the estimated position is stagnated without being increased, resulting in a large position error. When the position error is large, current cannot be caused to flow in an appropriate direction. As a result, a torque generated by the AC rotary machine decreases to cause a state in which the position of the AC rotary machine is fixed and cannot be rotated when the position error is equal to or larger than 90 deg.

Figure 13:
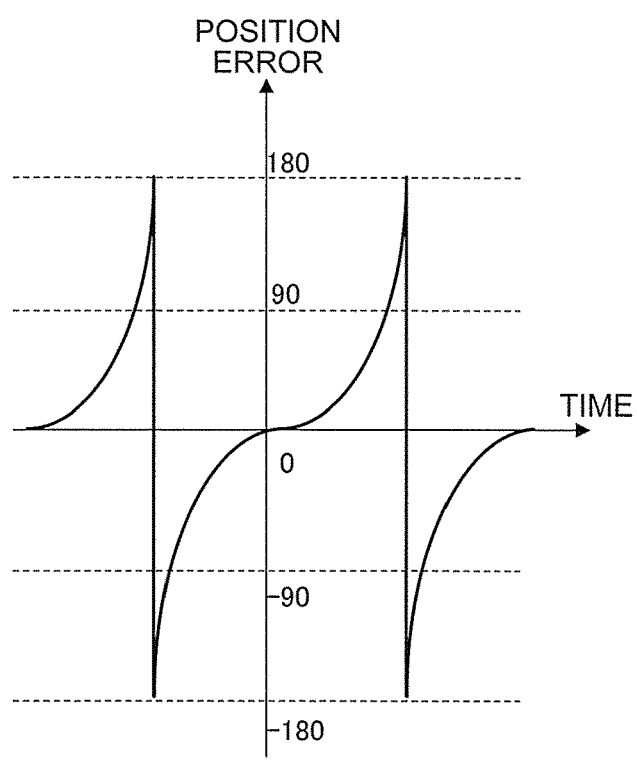
FIG. 13 is a graph for showing an influence of a case in which the error of the resistance value is positive.
Figure 14:
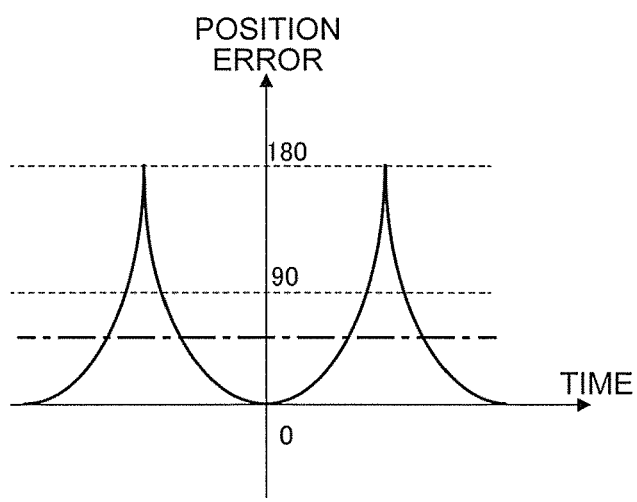
FIG. 14 is a graph for showing a value obtained by taking an absolute value of a waveform of FIG. 13, and is a graph for showing an influence of a case in which the error of the resistance value is positive.

Next, a description is given of a case in which the resistance value error is positive, that is, a case in which the model resistance value R is smaller than the actual resistance value. The positive resistance value error is referred to as "positive direction error". FIG. 13 is a graph for showing a time response of the position error when the resistance value is positive. FIG. 14 is a graph obtained by plotting again the time response of FIG. 13 with its vertical axis representing an absolute value of the position error. The solid line in FIG. 14 indicates the absolute value of the position error, and the long dashed short dashed line indicates the smoothed absolute value of the position error.

Based on Expression (1), when the model resistance value R is small, the RI term takes a small value, with the result that the estimated velocity is calculated to be a value larger than the actual velocity. Based on Expression (2), a large estimated velocity means a large increase amount of the estimated position, and an increase amount of the estimated position larger than the increase amount of the actual position causes a position error. However, when the position error increases to 360 deg, this means that the position error is equal to 0 deg, and then the position error starts to decrease. When the position error decreases, current can be caused to flow in an appropriate direction, resulting in an increased torque. The torque increases or decreases along with repetition of an increased position error that causes a decrease in torque and a decreased position error that causes an increase in torque. As a result, the position of the AC rotary machine oscillates. At this time, as the resistance value error becomes larger, the oscillation becomes larger.

As described above, when there is a resistance value error, the position of the AC rotary machine is fixed or oscillated, and thus the AC rotary machine cannot be rotated smoothly. The range of the resistance value error in which the AC rotary machine can be rotated smoothly is set as the resistance value error allowable range. The resistance value error allowable range is between the lower limit $\Delta Racptc$ and the upper limit $\Delta Racpth$.

According to a first aspect of the present invention, there is proposed a control device for an AC rotary machine, including: a temperature detection unit configured to detect an external temperature of the AC rotary machine, and to output the detected external temperature; and a resistance value estimation unit configured to estimate, based on the detected external temperature, an actual resistance value of the AC rotary machine, which changes depending on temperature of the AC rotary machine, and to output an estimated resistance value, in which the resistance value estimation unit is configured to calculate a basic estimated resistance value, which is a sum of a first resistance value defined as a fixed value and a second resistance value that is proportional to the detected external temperature, and to calculate the estimated resistance value by adding an estimated resistance correction value to the basic estimated resistance value, in which the estimated resistance correction value is a negative value having an absolute value that is larger than a difference between a lower limit value of a resistance value error allowable range and a deviation estimate, and is smaller than an absolute value of the deviation estimate, in which the deviation estimate is a value estimated in advance as a lower limit of a range that has a possibility of being taken by a deviation obtained by subtracting the basic estimated resistance value from the actual resistance value, and in which the resistance value error allowable range is a range of a resistance value error that enables the AC rotary machine to be rotated smoothly.

According to a second aspect of the present invention, there is proposed a control device for an AC rotary machine, including: a temperature detection unit configured to detect an external temperature of the AC rotary machine, and to output the detected external temperature; and a resistance value estimation unit configured to estimate, based on the detected external temperature, an actual resistance value of the AC rotary machine, which changes depending on temperature of the AC rotary machine, and to output an estimated resistance value, in which the resistance value estimation unit is configured to calculate a basic estimated resistance value, which is a sum of a first resistance value defined as a fixed value and a second resistance value that is proportional to the detected external temperature, and to calculate the estimated resistance value by adding an estimated resistance correction value to the basic estimated resistance value, in which the estimated resistance correction value is a positive value having an absolute value that is larger than a difference between an upper limit value of a resistance value error allowable range and a deviation estimate, and is smaller than an absolute value of the deviation estimate, in which the deviation estimate is a value estimated in advance an upper limit of a range that has a possibility of being taken by a deviation obtained by subtracting the basic estimated resistance value from the actual resistance value, and in which the resistance value error allowable range is a range of a resistance value error that enables the AC rotary machine to be rotated smoothly.

According to the first aspect of the present invention, there is provided the control device for an AC rotary machine, including: the temperature detection unit configured to detect the external temperature of the AC rotary machine, and to output the detected external temperature; and the resistance value estimation unit configured to estimate, based on the detected external temperature, the actual resistance value of the AC rotary machine, which changes depending on the temperature of the AC rotary machine, and to output the estimated resistance value, in which the resistance value estimation unit is configured to calculate the basic estimated resistance value, which is the sum of the first resistance value defined as a fixed value and the second resistance value that is proportional to the detected external temperature, and to calculate the estimated resistance value by adding the estimated resistance correction value to the basic estimated resistance value. With this, it is possible to estimate the actual resistance value, which changes depending on temperature. The estimated resistance correction value is a negative value having the absolute value that is larger than the difference between the lower limit value of the resistance value error allowable range and the deviation estimate, and is smaller than the absolute value of the deviation estimate, and the deviation estimate is a value estimated in advance as the lower limit of the range that has a possibility of being taken by the deviation obtained by subtracting the basic estimated resistance value from the actual resistance value. With this, it is possible to cause the lower limit of the range that can be taken by the resistance value estimation error obtained by subtracting the estimated resistance value from the actual resistance value to be larger than the lower limit value of the resistance value error allowable range, and it is also possible to prevent the upper limit of the range that can be taken by the resistance value estimation error from becoming larger than is necessary. Through setting of the resistance value error allowable range as a range of the resistance value error in which the AC rotary machine can be rotated smoothly in the configuration described above, an effect of rotating the AC rotary machine smoothly can be exhibited with a simple configuration in which the estimated resistance value is calculated by adding the estimated resistance correction value to the basic estimated resistance value, which is the sum of the first resistance value defined as a fixed value and the second resistance value that is proportional to the detected external temperature.

According to the second aspect of the present invention, there is provided the control device for an AC rotary machine, including: the temperature detection unit configured to detect the external temperature of the AC rotary machine, and to output the detected external temperature; and the resistance value estimation unit configured to estimate, based on the detected external temperature, the actual resistance value of the AC rotary machine, which changes depending on the temperature of the AC rotary machine, and to output the estimated resistance value, in which the resistance value estimation unit is configured to calculate the basic estimated resistance value, which is the sum of the first resistance value defined as a fixed value and the second resistance value that is proportional to the detected external temperature, and to calculate the estimated resistance value by adding the estimated resistance correction value to the basic estimated resistance value. With this, it is possible to estimate the actual resistance value, which changes depending on temperature. The estimated resistance correction value is a positive value having an absolute value that is larger than the difference between the upper limit value of the resistance value error allowable range and the deviation estimate, and is smaller than the absolute value of the deviation estimate, and the deviation estimate is a value estimated in advance as the upper limit of the range that has a possibility of being taken by the deviation obtained by subtracting the basic estimated resistance value from the actual resistance value. With this, it is possible to cause the upper limit of the range that can be taken by the resistance value estimation error obtained by subtracting the estimated resistance value from the actual resistance value to be larger than the upper limit value of the resistance value error allowable range, and it is also possible to prevent the lower limit of the range that can be taken by the resistance value estimation error from becoming smaller than is necessary. Through setting of the resistance value error allowable range as a range of the resistance value error in which the AC rotary machine can be rotated smoothly in the configuration described above, an effect of rotating the AC rotary machine smoothly can be exhibited with a simple configuration in which the estimated resistance value is calculated by adding the estimated resistance correction value to the basic estimated resistance value, which is the sum of the first resistance value defined as a fixed value and the second resistance value that is proportional to the detected external temperature.

Now, a control device for an AC rotary machine and the like according to each of embodiments of the present invention are described with reference to the drawings. In each of the embodiments, the same or corresponding portion is denoted by the same reference symbol, and the overlapping description thereof is omitted.

First Embodiment

Figure 1:
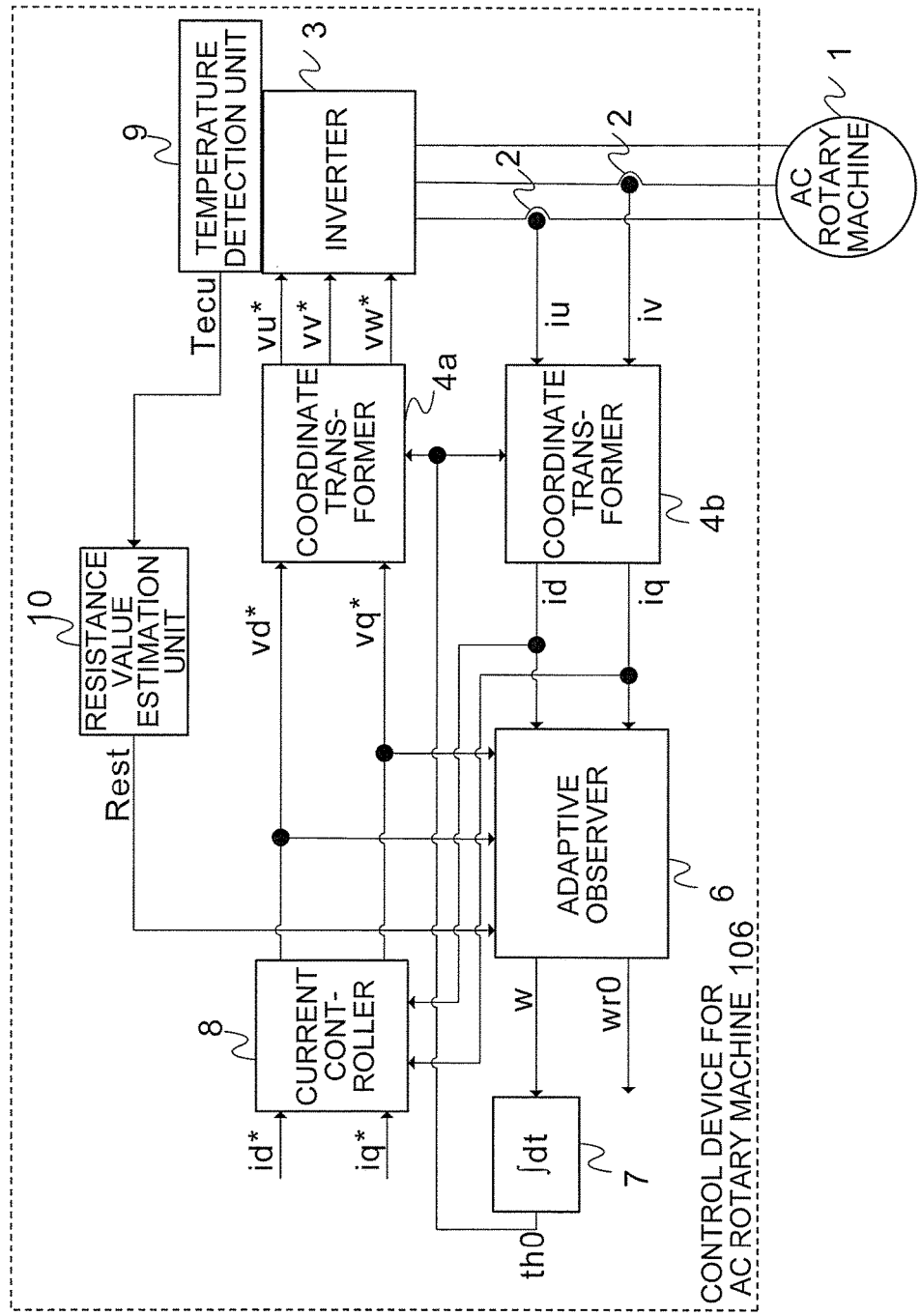
FIG. 1 is a diagram for illustrating an example of a configuration of a control device for an AC rotary machine according to first and second embodiments of the present invention.
Figure 15:
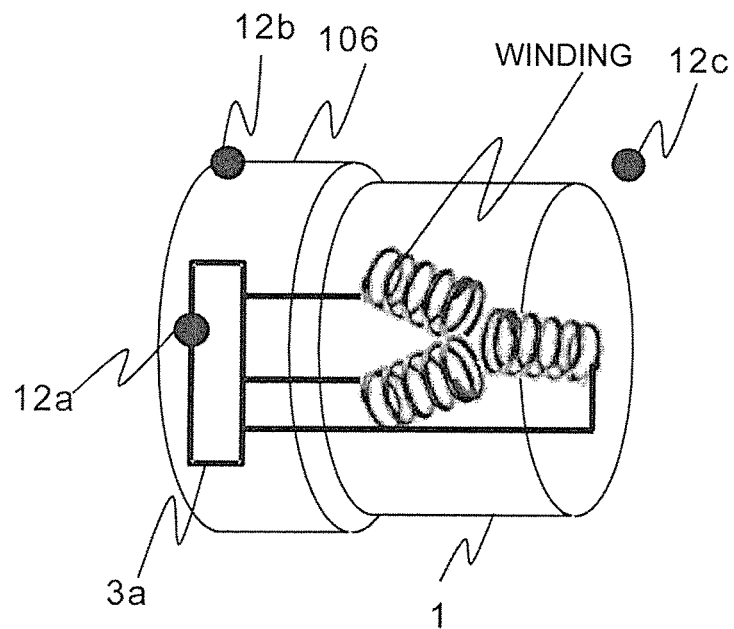
FIG. 15 is a diagram for illustrating an example of a configuration in which the control device for an AC rotary machine according to the first embodiment of the present invention and the AC rotary machine are integrated, and is an illustration of an example of a temperature measurement point of an external temperature of the AC rotary machine.

FIG. 1 is a diagram for illustrating an example of a configuration of a control device for an AC rotary machine according to first and second embodiments of the present invention. FIG. 1 is an illustration of a configuration in which a temperature detection unit 9 and a resistance value estimation unit 10 are included in addition to, for example, components of FIG. 1 of Patent Literature 2. In FIG. 1, an AC rotary machine 1 to be controlled is illustrated together with a control device 106 for an AC rotary machine, and the control device 106 for an AC rotary machine and the AC rotary machine 1 are integrated. "Integrated" means that the control device 106 for an AC rotary machine and the AC rotary machine 1 are in contact with each other adjacently, and for example, indicates a configuration as illustrated in FIG. 15. Further, the AC rotary machine 1 is, for example, a synchronous motor, and is used under an operating condition that causes a small amount of continuous current to flow. For example, when a vehicle is traveling, an electric power steering system is used under the operating condition that causes a small amount of continuous current to flow.

In the following, two rotation axes of the AC rotary machine 1, namely, a first axis and a second axis are represented as follows for description. Specifically, the first axis lies in the same phase direction as that of a rotor magnetic flux of the AC rotary machine 1, and is represented as a d-axis. The second axis lies in a direction perpendicular to the first axis, and is represented as a q-axis.

A current controller 8 is configured to calculate a d-axis voltage instruction vd* and a q-axis voltage instruction vq* based on a d-axis current instruction id*, a q-axis current instruction iq*, a d-axis current id, and a q-axis current iq.

A (first) coordinate transformer 4a is configured to transform coordinates of the d-axis voltage instruction vd* and the q-axis voltage instruction vq* to obtain three-phase voltage instructions vu*, vv*, and vw* based on a rotation position (estimated position) th0 obtained from an integrator 7. Thus, the rotation position (estimated position) th0 is also a phase of an alternating voltage of the AC rotary machine 1.

An inverter 3 is configured to apply a three-phase alternating voltage to the AC rotary machine 1 based on the three-phase voltage instructions vu*, vv*, and vw*.

In short, the coordinate transformer 4a and the inverter 3 form a current supply unit configured to apply alternating voltages vu, vv, and vw, which are based on the voltage instructions vd* and vq* on the two rotation axes, to the AC rotary machine 1 in accordance with the phase of the alternating voltage indicated by the rotation position (estimated position) th0.

In contrast, the current controller 8, a (second) coordinate transformer 4b described later, an adaptive observer 6, and the integrator 7 form a calculation unit.

The (second) coordinate transformer 4b is configured to transform coordinates of a U-phase current iu and a V-phase current iv obtained from a current detection unit 2 based on the rotation position (estimated position) th0 obtained from the integrator 7, to output the d-axis current id and the q-axis current iq.

The adaptive observer 6 is a velocity estimation unit, and is configured to output an angular frequency w, which is an estimated velocity, based on the d-axis voltage instruction vd*, the q-axis voltage instruction vq*, the d-axis current id, the q-axis current iq, and an estimated resistance value Rest.

The integrator 7 is a position estimation unit, and is configured to integrate the estimated velocity w obtained from the adaptive observer 6 to output the rotation position th0, which is an estimated position.

Figure 16:
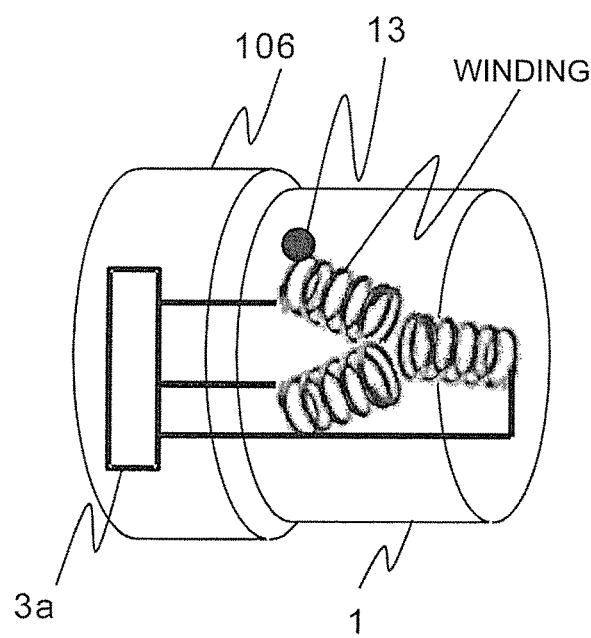
FIG. 16 is a diagram for illustrating an example of a configuration in which the control device for an AC rotary machine according to the first embodiment of the present invention and the AC rotary machine are integrated, and is an illustration of an example of a temperature measurement point of an internal temperature of the AC rotary machine.

The temperature detection unit 9 is installed on a board of the inverter 3, and is configured to detect an external temperature of the AC rotary machine 1 to output a detected temperature Tecu. The external temperature of the AC rotary machine 1 indicates, for example, temperature measurement points 12a to 12c of FIG. 15. In contrast, a temperature (e.g., the temperature of winding of the AC rotary machine 1) to be measured at a measurement point, e.g., a temperature measurement point 13 of FIG. 16, is an internal temperature of the AC rotary machine 1. The temperature detection unit 9 has been described as being installed on a board 3a (refer to FIG. 15 and FIG. 16) of the inverter 3, but the installation position is not limited thereto as long as the position enables the temperature detection unit 9 to measure the external temperature of the AC rotary machine 1. For example, the temperature detection unit 9 may be installed at a position (12c) for measuring the temperature of a space in which the AC rotary machine 1 is installed. The range that can be taken by the detected temperature Tecu is between a lower limit T1 and an upper limit T2.

The resistance value estimation unit 10 is configured to estimate an actual resistance value Rreal of the AC rotary machine 1 based on the detected temperature Tecu, and to output the estimated resistance value Rest.

In the first and second embodiments of the present invention, the actual resistance value Rreal of the AC rotary machine 1 is a sum of a resistance value Rm of winding (not shown) of an armature of the AC rotary machine 1 and a resistance value Recu of the inverter 3.

The configuration of the adaptive observer 6 is the same as that of a second embodiment of Patent Literature 2, which is the related art, and thus description thereof is simplified here. The angular frequency w, which is the estimated velocity, is calculated based on Expressions (3) to (6).

[Math. 2]

$$w = wr0 - \frac{e04}{pdr0} \quad (3)$$

$$wr0 = \left(kp + \frac{ki}{s}\right)(eq \cdot pdr0) \quad (4)$$

$$\frac{d}{dt}\begin{pmatrix} id0 \\ iq0 \\ pdr0 \end{pmatrix} = \quad (5)$$

$$\begin{pmatrix} -\frac{R}{Ld} & \frac{Lq}{Ld}w & 0 \\ -\frac{Ld}{Lq}w & -\frac{R}{Lq} & -\frac{wr0}{Lq} \\ 0 & 0 & 0 \end{pmatrix}\begin{pmatrix} id0 \\ iq0 \\ pdr0 \end{pmatrix} + \begin{pmatrix} \frac{1}{Ld} & 0 \\ 0 & \frac{1}{Lq} \\ 0 & 0 \end{pmatrix}\begin{pmatrix} vd^* \\ vq^* \end{pmatrix} - \begin{pmatrix} e01 \\ e02 \\ e03 \end{pmatrix}$$

-continued $$\begin{pmatrix} e01 \\ e02 \\ e03 \\ e04 \end{pmatrix} = \begin{pmatrix} g11 & g12 \\ g21 & g22 \\ g31 & g32 \\ g41 & g42 \end{pmatrix} \begin{pmatrix} ed \\ eq \end{pmatrix} \quad (6)$$

Each observer gain of Expression (6) is defined as represented by Expressions (7) to (14).

[Math. 3]

$$g11 = -(k-1)\frac{R}{Ld} \quad (7)$$

$$g12 = -(k-1)\frac{Ld}{Lq}wr0 \quad (8)$$

$$g21 = (k-1)\frac{Lq}{Ld}wr0 \quad (9)$$

$$g22 = -(k-1)\frac{R}{Lq} \quad (10)$$

$$g31 = kR \quad (11)$$

$$g32 = kLqwr0 \quad (12)$$

$$g41 = -kLdwr0 \quad (13)$$

$$g42 = kR \quad (14)$$

In the first embodiment, the model resistance value R in Expressions (3) to (14) is replaced with the estimated resistance value Rest, which is an output of the resistance value estimation unit 10, to calculate the estimated velocity w.

Figure 2:
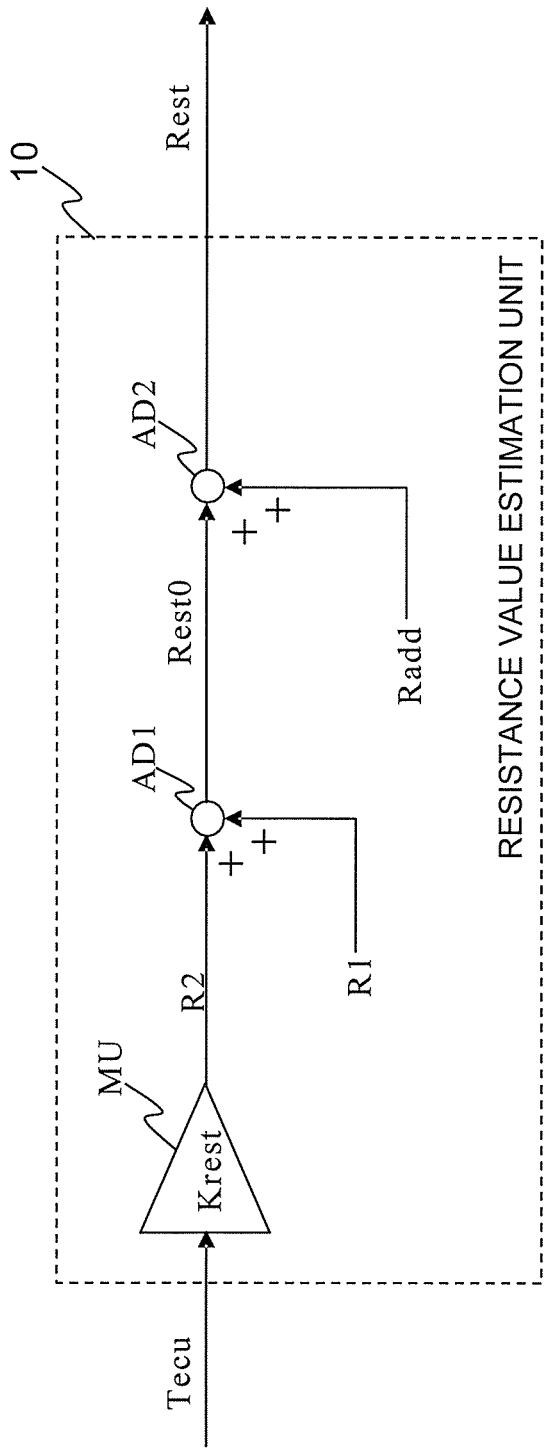
FIG. 2 is a diagram for illustrating an example of a configuration of a resistance value estimation unit of FIG. 1.

An example of the configuration of the resistance value estimation unit 10 is illustrated in FIG. 2. The resistance value estimation unit 10 is configured to add with an adder AD1 a first resistance value R1, which is defined as a fixed value, and a second resistance value R2, which is obtained by multiplying the detected temperature Tecu by a proportional coefficient Krest with a multiplier MU, to calculate a basic estimated resistance value Rest0, and then to add with an adder AD2 the basic estimated resistance value Rest0 and an estimated resistance correction value Radd, to thereby output the estimated resistance value Rest.

Figure 17:
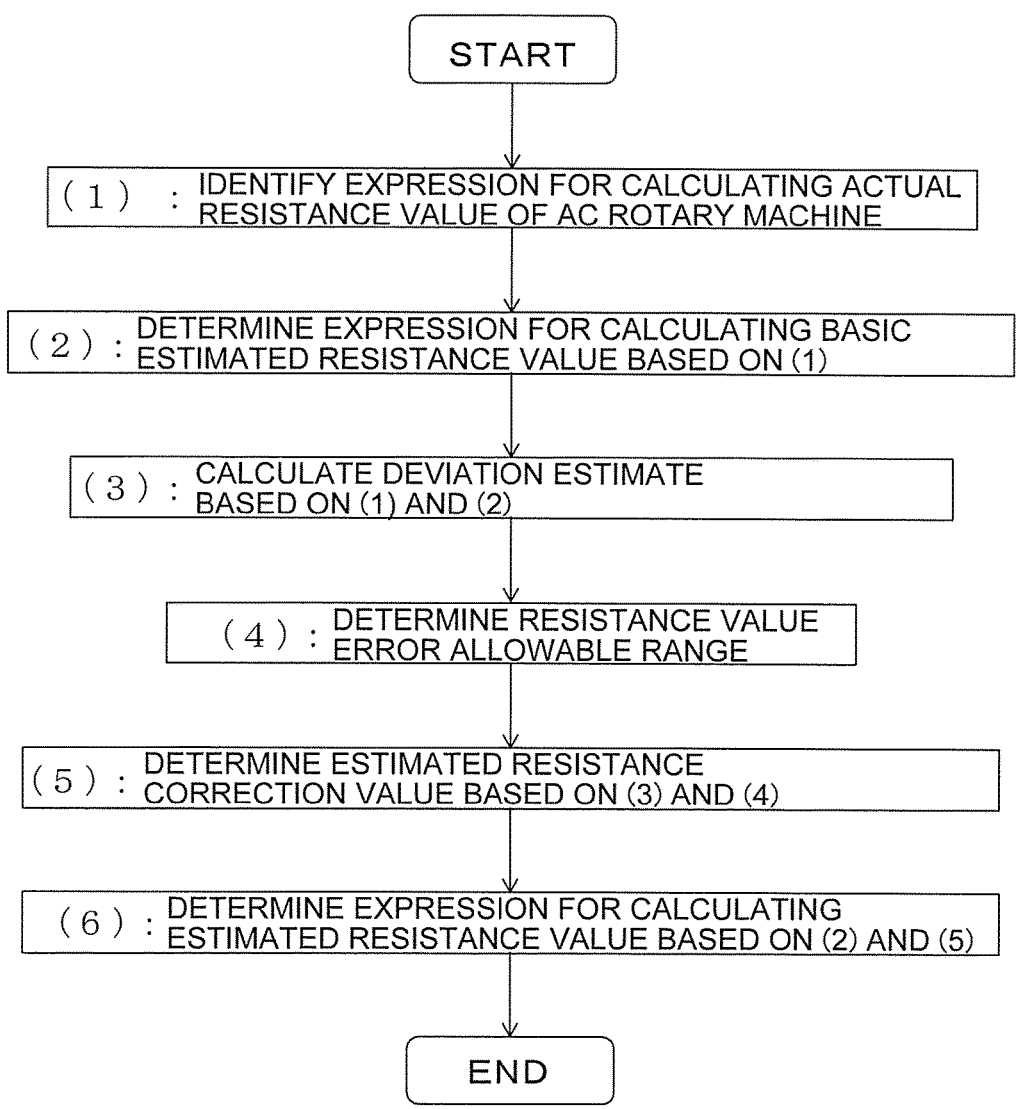
FIG. 17 is a flowchart for illustrating an example of a procedure for determining an expression for calculating the estimated resistance value according to the present invention.

Rest0 of FIG. 2 can be represented by Expression (15) and Rest can be represented by Expression (16). A value obtained in advance that is substantially proportional to the detected temperature may be stored as a map, and the second resistance value R2 may be referred to from the map. The expression for calculating the estimated resistance value represented by Expression (16) is determined in accordance with a procedure of FIG. 17.

Now, the outline is described. In Step (1), the expression for calculating the actual resistance value of the AC rotary machine is identified, and in Step (2), the expression for calculating the basic estimated resistance value is determined based on the expression for calculating the actual resistance value identified in Step (1).

Next, in Step (3), a deviation estimate is calculated based on the expression for calculating the actual resistance value of Step (1) and the expression for calculating the basic estimated resistance value of Step (2), and in Step (4), the resistance value error allowable range is determined based on the relationship between the position error and the resistance value error in the first and second embodiments, or the relationship between a voltage error and a resistance value error in third and fourth embodiments of the present invention.

Then, in Step (5), the estimated resistance correction value is determined based on the deviation estimate of Step (3) and the resistance value error allowable range of Step (4). Then, in Step (6), the expression for calculating the estimated resistance value is determined based on the expression for calculating the basic estimated resistance value of Step (2) and the estimated resistance correction value value of Step (5).

[Math. 4]

$$R_{est0}(T_{ecu}) = R_1 + K_{rest} \cdot T_{ecu} \quad (15)$$

$$R_{est}(T_{ecu}) = R_{est0} + R_{add} = R_1 + K_{rest} \cdot T_{ecu} + R_{add} \quad (16)$$

The estimated resistance correction value Radd is determined as follows. First, a lower limit of a range that can be taken by a deviation, which is obtained by subtracting the basic estimated resistance value Rest0 from the actual resistance value Rreal, is estimated in advance. "Estimated in advance" means obtaining and setting the value in advance based on, for example, an experiment result or calculation (the same applies in the following). The value estimated in advance is, for example, a value obtained in advance that is stored in a storage unit or the like (not shown) in advance, for calculating and setting the value of the estimated resistance correction value Radd. Further, for example, the value estimated in advance may be stored in the storage unit or the like in advance, and the value of the estimated resistance correction value Radd may be calculated online with use of a map or a function. The actual resistance value Rreal of the AC rotary machine 1 is represented by Expression (17). The actual resistance value Rreal of the AC rotary machine 1 is set as a value obtained by adding the resistance value Rm of winding of the AC rotary machine 1 and the resistance value Recu of the inverter 3. Regarding Expression (17), the resistance value Rm of winding of the AC rotary machine 1 includes Rm0, which is defined as a fixed value, a term that is proportional to Tm, which is the temperature of winding of the AC rotary machine 1, with a proportional coefficient km, and a term that is proportional to the temperature Tecu of the inverter 3, which is the detected temperature, with a proportional coefficient kecu. Each parameter in Expression (17) may be identified from a result of measuring the resistance value by varying temperature, or may be obtained by substituting a physical value into the parameter.

Further, the actual resistance value Rreal of the AC rotary machine 1 is set as the value obtained by adding the resistance value Rm of winding of the AC rotary machine 1 and the resistance value Recu of the inverter 3, but may be set as only the resistance value Rm of winding of the AC rotary machine 1 or may be set as a value obtained by adding resistance values of other elements included in a current path in the same manner as represented by Expression (17).

[Math. 5]

$$\begin{aligned} R_{real}(T_m, T_{ecu}) &= R_m(T_m) + R_{ecu}(T_{ecu}) \\ &= R_{m0}(1 + k_m T_m) + R_{ecu0}(1 + k_{ecu} T_{ecu}) \\ &= (R_{m0} + R_{ecu0}) + R_{m0} k_m T_m + R_{ecu0} k_{ecu} T_{ecu} \\ &= R_1 + R_{m0} k_m T_m + R_{ecu0} k_{ecu} T_{ecu} \end{aligned} \quad (17)$$

When a temperature difference ΔTme between the detected temperature Tecu and the temperature Tm of winding of the AC rotary machine 1 of Expression (18) is used to represent Expression (17), Expression (19) is obtained.
[Math. 6]

$$\Delta T_{me} = T_m - T_{ecu} \quad (18)$$

$$R_{real}(T_{ecu}, \Delta T_{me}) = R_1 + (R_{m0}k_m + R_{ecu0}k_{ecu})T_{ecu} + R_{m0}k_m\Delta T_{me} \quad (19)$$

Based on Expressions (15) and (19), an expression for calculating a deviation (resistance value error ΔR) obtained by subtracting the basic estimated resistance value Rest0 from the actual resistance value Rreal is obtained as represented by Expression (20).

[Math. 7]

$$\begin{aligned}\Delta R &= R_{real} - R_{est0} \quad (20)\\ &= R_{m0}k_mT_m + \\ &\quad \{R_{ecu0}k_{ecu} - (R_{m0} + R_{ecu0})K_{rest}\}\Delta T_{ecu}\end{aligned}$$

When the proportional coefficient Krest is defined by Expression (21), the deviation obtained by subtracting the basic estimated resistance value Rest0 from the actual resistance value Rreal is represented by Expression (22). Although the proportional coefficient Krest is defined by Expression (21), the manner of defining the proportional coefficient Krest of the basic estimated resistance value Rest0 is not limited thereto. Expression (21) is used to take advantage of the fact that Expression (22) can be expressed in a simple form of a single term as a function with a variable of the temperature difference ΔTme.

[Math. 8]

$$K_{rest} = \frac{R_{m0}k_m + R_{ecu0}k_{ecu}}{(R_{m0} + R_{ecu0})} \quad (21)$$

$$\Delta R = R_{m0}k_m\Delta T_{me} \quad (22)$$

Incidentally, there is an individual difference in the actual resistance value Rreal. The actual resistance value Rreal is represented by Expression (23) when a range Qm of the individual difference in the resistance value Rm of winding of the AC rotary machine 1 and a range Qecu of the individual difference in the resistance value Recu of the inverter 3 are taken into consideration.

Expression (23) is obtained by replacing, in Expression (19), Rm0 with (1+Qm)Rm0 and Recu0 with (1+Qecu)Recu0 on the assumption that there are individual differences in Rm0 and Recu0.
[Math. 9]

$$R_{real}(T_m, T_{ecu}) = (R_{m0}+R_{ecu0}) + (Q_mR_{m0}+Q_{ecu}R_{ecu0}) + (1+Q_m)R_{m0}k_mT_m + (1+Q_{ecu})R_{ecu0}k_{ecu}T_{ecu} \quad (23)$$

Expression (18) is substituted into Expression (23) to obtain Expression (24) as a function of the temperature difference ΔTme.
[Math. 10]

$$R_{real}(T_m, T_{ecu}) = (R_{m0}+R_{ecu0}) + (Q_mR_{m0}+Q_{ecu}R_{ecu0}) + \{(1+Q_m)R_{m0}k_m + (1+Q_{ecu})R_{ecu0}k_{ecu}\}T_{ecu} + (1+Q_m)R_{m0}k_m\Delta T_{me} \quad (24)$$

Figure 3:
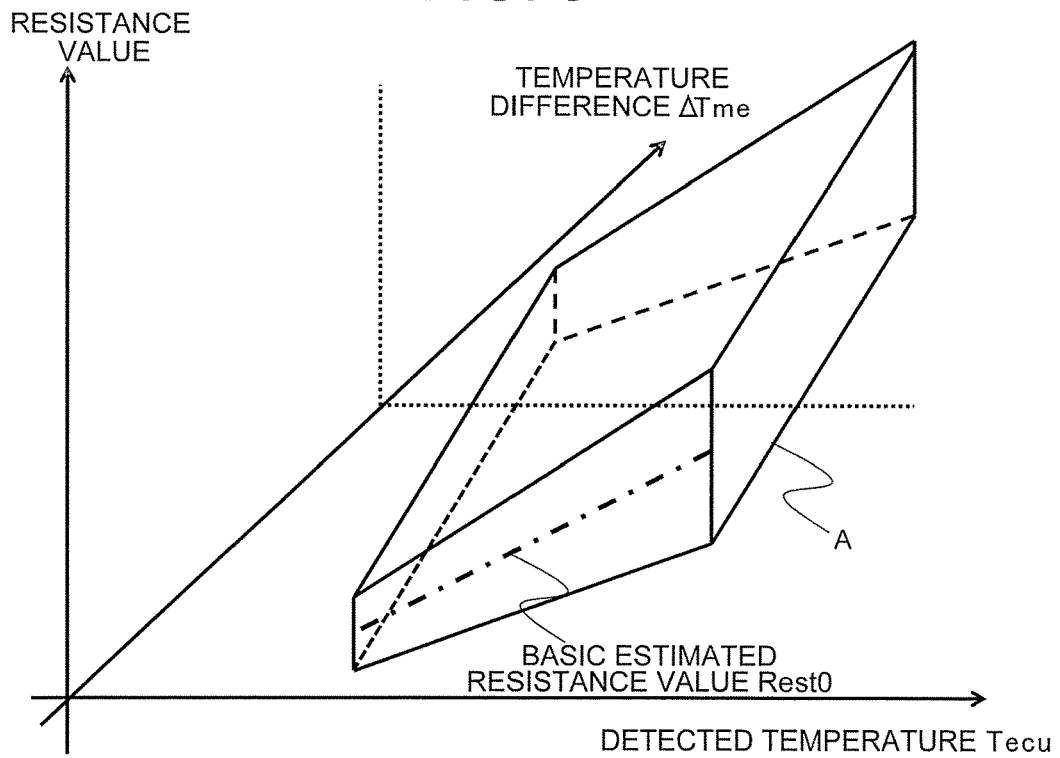
FIG. 3 is a graph for showing an example of a relationship between a range that can be taken by an actual resistance value of the AC rotary machine according to the present invention and a basic estimated resistance value.

Based on Expression (24), when the range that can be taken by the actual resistance value Rreal is shown, a range enclosed by the line A of FIG. 3 (the range contains values on the line A, which applies in the following) is obtained. In FIG. 3, regarding an object having no individual difference, when there is no temperature difference between the detected temperature Tecu and the temperature Tm of winding of the AC rotary machine 1, the actual resistance value Rreal and the basic estimated resistance value Rest0 match with each other. However, regarding an object having an individual difference, when there is a temperature difference between the detected temperature Tecu and the temperature Tm of winding of the AC rotary machine 1, a deviation is caused in the actual resistance value Rreal of the AC rotary machine 1 due to the individual difference or the temperature difference.

Based on Expressions (15) and (24), the deviation between the actual resistance value Rreal of the AC rotary machine 1 and the basic estimated resistance value Rest0 is represented by Expression (25). Based on Expression (25), it is clear that the range that can be taken by the deviation between the actual resistance value Rreal of the AC rotary machine 1 and the basic estimated resistance value Rest0 is obtained by giving the range that can be taken by the individual difference, the range that can be taken by the detected temperature Tecu, and the range that can be taken by the temperature difference ΔTme.

[Math. 11]

$$\begin{aligned}\Delta R(Q_m, Q_{ecu}, T_{ecu}, \Delta T_{me}) &= R_{m0}k_m\Delta T_{me} + (R_{m0}Q_m + R_{ecu0}Q_{ecu}) + \quad (25)\\ &\quad R_{m0}Q_mk_m\Delta T_m + R_{ecu0}Q_{ecu}k_{ecu}\Delta T_{ecu}\\ &= (R_{m0}Q_m + R_{ecu0}Q_{ecu}) + \\ &\quad (R_{ecu0}Q_{ecu}k_{ecu})\Delta T_{ecu} + \\ &\quad (R_{m0}k_m + R_{ecu0}Q_{ecu}k_{ecu})\Delta T_{me}\\ &= \Delta R(Q_m, Q_{ecu}) + \Delta R(Q_m, Q_{ecu}, T_{ecu}) + \\ &\quad \Delta R(Q_m, Q_{ecu}, \Delta T_{me})\end{aligned}$$

In the first embodiment, the control device for an AC rotary machine and the AC rotary machine 1 are integrated as described above, and thus ambient temperatures for those device and machine are the same. In addition, a small amount of continuous current flows, and thus the temperature rise of the AC rotary machine 1 due to the current flow is small. This small temperature rise of the AC rotary machine 1 results in a small temperature difference between the temperature Tm of the AC rotary machine 1 and the detected temperature Tecu.

Figure 4:
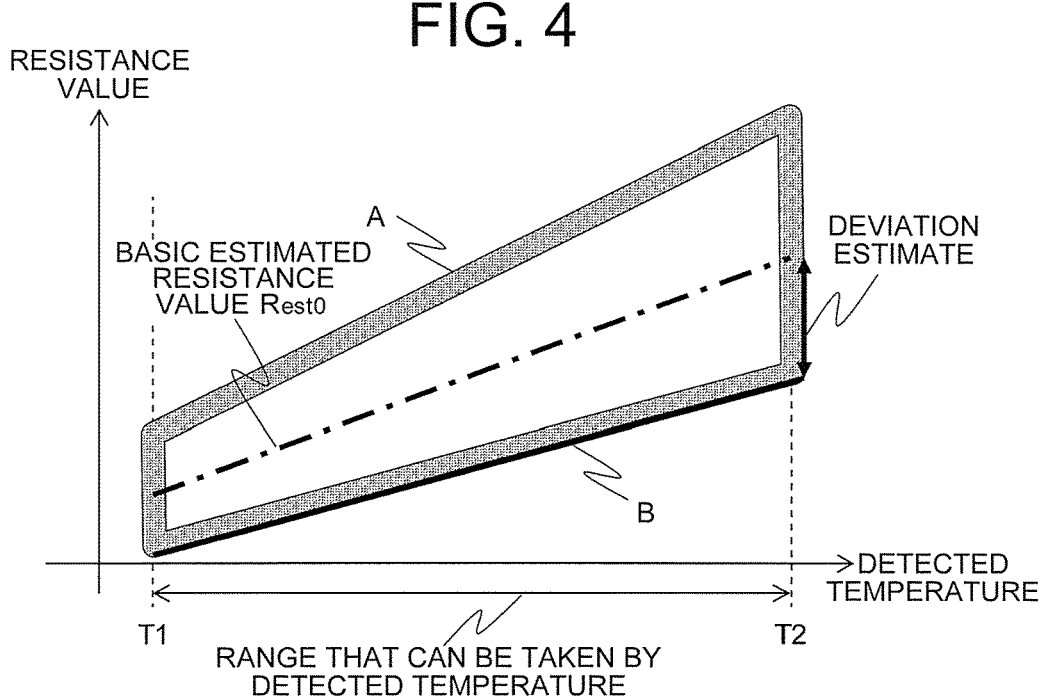
FIG. 4 is a graph for showing an example of a deviation estimate according to the first embodiment of the present invention.

In view of this, when the range that can be taken by the actual resistance value Rreal of FIG. 3 is projected two dimensionally with the horizontal axis taken as the detected temperature Tecu, the range that can be taken by the actual resistance value Rreal is shown as a range enclosed by the line A of FIG. 4. For example, an object having a lower limit of the range of an individual difference, which is, for example, smaller than a central value of the actual resistance value, takes a value of the line B of FIG. 4.

In this case, the deviation estimate of the first embodiment is a value estimated in advance as the lower limit of the range that can be taken by the deviation obtained by subtracting the basic estimated resistance value Rest0 from the actual resistance value Rreal. In other words, the deviation estimate is a negative resistance value error (ΔR) whose absolute value is the largest within the range that can be taken by the detected temperature Tecu.

In FIG. 4, the deviation estimate can be calculated based on Expression (25) with T2, which is an upper limit of the range that can be taken by the detected temperature Tecu, as a detection temperature for estimating the deviation. The range that can be taken by the detected temperature Tecu may be the temperature range of a space in which the control device for an AC rotary machine is installed, or may be temperature that can be detected by the temperature detection unit 9. The temperature difference Δtme is obtained based on an upper limit or lower limit of a rotary machine temperature range for the deviation estimate, which is the range of temperature that can be taken by the temperature of the AC rotary machine 1, at the detection temperature for estimating the deviation. Further, Qm and Qecu, which represent individual differences, may be obtained by substituting the upper limit or lower limit of the range that can be taken by the individual difference into those values.

In FIG. 4 shown in this description, the deviation estimate is calculated with the one upper limit of the range that can be taken by the detected temperature as a detection temperature for estimating the deviation. However, the detection temperature for estimating the deviation is not limited to be the upper limit of the range that can be taken by the detected temperature Tecu depending on the relationship between the actual resistance value Rreal and the basic estimated resistance value Rest0. Therefore, based on the detection temperature for estimating the deviation, which is obtained by extracting one or a plurality of points from the range that can be taken by the detected temperature Tecu, the lower limit of the range that can be taken by the deviation obtained by subtracting the basic estimated resistance value Rest0 from the actual resistance value Rreal is estimated in advance based on Expression (25). At this time, as represented by Expression (24) shown in the first embodiment, when the actual resistance value Rreal is proportional to temperature, the lower limit of the range that can be taken by the deviation is the value of the upper limit or lower limit of the range that can be taken by the detected temperature Tecu.

Figure 5:
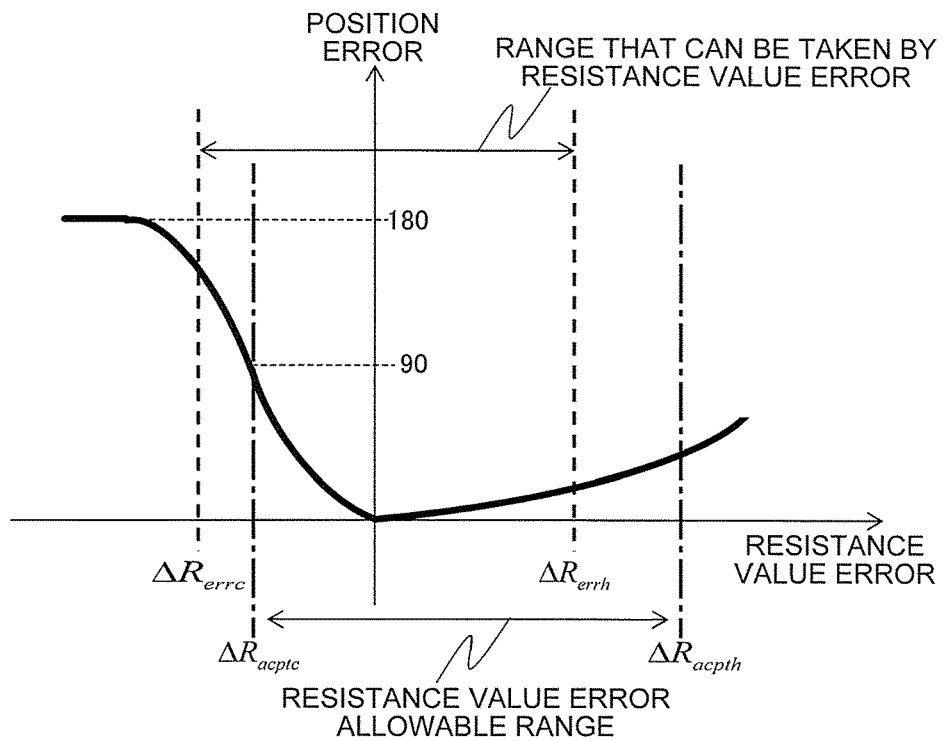
FIG. 5 is a graph for showing a resistance value error allowable range and a range that can be taken by a resistance value error according to the first embodiment of the present invention, and is a graph for showing an example of a range that can be taken by a deviation between the actual resistance value and the basic estimated resistance value.

Next, the resistance value error allowable range is determined based on the basic characteristic with respect to the position error. FIG. 5 is a graph for showing the range that can be taken by the deviation and the resistance value error allowable range in the first embodiment together with the basic characteristic with respect to the position error of FIG. 11. The range that can be taken by the resistance value error of FIG. 5 has the same meaning as the range that can be taken by the deviation between the actual resistance value Rreal and the basic estimated resistance value Rest0.

The resistance value error allowable range is a range of the resistance value error ΔR in which the AC rotary machine 1 can be rotated smoothly. Thus, a lower limit Racptc of the resistance value error allowable range is set as the smallest resistance value error that enables the AC rotary machine 1 to be rotated smoothly without its position being fixed, and an upper limit Racpth of the resistance value error allowable range is set as the largest resistance value error that enables the magnitude of vibration to fall within a predetermined range. The lower limit Racptc of the resistance value error allowable range is not limited to the value of a resistance value error having a position error of 90 deg or more, but may be set as the value of a resistance value error having, for example, a position error of 80 deg or more in consideration of a margin. Further, the manner of evaluating the magnitude of vibration is not particularly defined, and the magnitude of vibration may be evaluated by a magnitude of velocity change, or may be evaluated by a magnitude of torque change.

Figure 6:
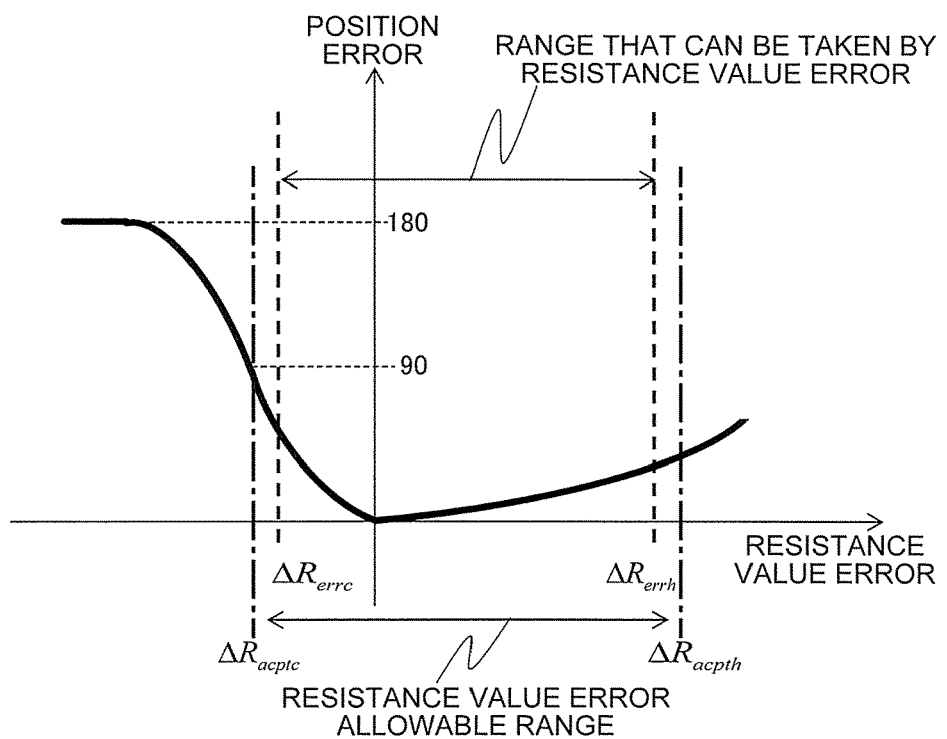
FIG. 6 is a graph for showing the resistance value error allowable range and the range that can be taken by the resistance value error according to the first embodiment of the present invention, and is a graph for showing an example of a range that can be taken by the resistance value error between the actual resistance value and the estimated resistance value.

In this case, the estimated resistance correction value Radd is a negative value satisfying the condition of Expression (26), the condition indicating that the estimated resistance correction value Radd has an absolute value that is larger than a difference between the lower limit value of the resistance value error allowable range and the deviation estimate, and is smaller than the absolute value of the deviation estimate. Through setting of the estimated resistance correction value Radd as a value satisfying Expression (26), the range that can be taken by the resistance value error ΔR, which is a difference between the actual resistance value Rreal of the AC rotary machine 1 and the estimated resistance value Rest, can be caused to fall within the resistance value error allowable range, as shown in FIG. 6.

[Math. 12]

$$|\Delta R_{acptc} - \Delta R_{errc}| \leq |R_{add}| \leq |\Delta R_{errc}| \tag{26}$$

Through setting of the estimated resistance correction value Radd as a value satisfying the condition of Expression (26), it is possible to cause the AC rotary machine to be rotated smoothly without the position of the AC rotary machine 1 being fixed.

Further, giving the estimated resistance correction value Radd as Expression (27) based on the left side of Expression (26) prevents the resistance value error ΔR from becoming larger than is necessary in a positive direction, and thus it is possible to achieve a minimum increase in vibration and cause the AC rotary machine 1 to be rotated smoothly.

[Math. 13]

$$|R_{add}| = |\Delta R_{acptc} - \Delta R_{errc}| \tag{27}$$

Further, a margin Rmargin may be added to the estimated resistance correction value Radd as represented by Expression (28) as long as the condition of Expression (26) is satisfied. In this case, the increase in vibration can be suppressed to the minimum by setting the value of the given margin to the minimum.

[Math. 14]

$$|R_{add}| = |\Delta R_{acptc} - \Delta R_{errc}| + |R_{m\ arg\ in}| \tag{28}$$

Through estimation of the velocity (w) and the position (th0) with use of the estimated resistance value (Rest), which is obtained by adding the resistance correction value (Radd) determined as described above to the basic estimated resistance value (Rest0), it is possible to reduce the negative direction error and prevent the position of the AC rotary machine from being fixed, and it is also possible to achieve the minimum increase in vibration without causing the positive direction error to become larger than is necessary. Therefore, it is possible to cause the AC rotary machine to be rotated smoothly.

A feature of the first embodiment resides in the resistance value estimation unit 10 configured to calculate the estimated resistance value Rest from the detected temperature Tecu, which is an external temperature of the AC rotary machine 1. Therefore, the method of estimating a specific velocity and position described in the first embodiment is only an example, and is not limited thereto. In other words, the velocity and position may be calculated in an arbitrary manner as long as the velocity and position are estimated based on the estimated resistance value Rest. For example, the calculation may be conducted as disclosed in Patent Literature 1.

Further, in the first embodiment, the control device for an AC rotary machine and the AC rotary machine are integrated, and an AC rotary machine that necessitates a small amount of continuous current to flow is discussed. However, the configuration is not limited to such a configuration of the control device for an AC rotary machine and the AC rotary machine as long as the lower limit of the resistance value error is negative and has a large absolute value. For example, there may be employed a configuration in which the control device for an AC rotary machine and the AC rotary machine are installed in separate places, and the detected temperature becomes higher than the temperature of the AC rotary machine.

As described above, according to the first embodiment of the present invention, there is provided a control device for an AC rotary machine including: a temperature detection unit configured to detect an external temperature of the AC rotary machine, and to output the detected external temperature; and a resistance value estimation unit configured to estimate, based on the detected external temperature, an actual resistance value of the AC rotary machine, which changes depending on temperature of the AC rotary machine, and to output an estimated resistance value, in which the resistance value estimation unit is configured to calculate a basic estimated resistance value, which is a sum of a first resistance value defined as a fixed value and a second resistance value that is proportional to the detected external temperature, and to calculate the estimated resistance value by adding an estimated resistance correction value to the basic estimated resistance value. As a result, it is possible to estimate the actual resistance value, which changes depending on temperature, with a simple configuration.

The estimated resistance correction value is a negative value having an absolute value that is larger than the difference between the lower limit value of the resistance value error allowable range and the deviation estimate, and is smaller than the absolute value of the deviation estimate. The deviation estimate is a value estimated in advance as the lower limit of the range that has a possibility of being taken by the deviation obtained by subtracting the basic estimated resistance value from the actual resistance value. With this, it is possible to cause the lower limit of the range that can be taken by the resistance value estimation error obtained by subtracting the estimated resistance value from the actual resistance value to be larger than the lower limit value of the resistance value error allowable range, and it is also possible to prevent the upper limit of the range that can be taken by the resistance value estimation error from becoming larger than is necessary.

The deviation estimate can be calculated based on a detection temperature for estimating the deviation, the detection temperature being obtained by extracting one or a plurality of points from a range that has a possibility of being taken by the detected temperature, a temperature difference between the detected temperature and the temperature of winding of the AC rotary machine, and the range that has a possibility of being taken by the individual difference of the actual resistance value.

The temperature difference between the detected temperature and the temperature of winding of the AC rotary machine is obtained based on the upper limit or lower limit of the rotary machine temperature range for the deviation estimate, which is the range of temperature that can be taken by the temperature of the AC rotary machine, at the detection temperature for estimating the deviation. In other words, the deviation estimate is a value that is based on the upper limit or lower limit of the rotary machine temperature range for the deviation estimate, which is the range of temperature that can be taken by the temperature of the AC rotary machine, at the detection temperature for estimating the deviation.

With the configuration described above, an effect of rotating the AC rotary machine smoothly can be exhibited by setting the resistance value error allowable range as a range of the resistance value error in which the AC rotary machine can be rotated smoothly, and applying a voltage to the AC rotary machine with the current supply unit configured to, based on the estimated resistance value, apply an alternating voltage to the AC rotary machine based on a phase of the alternating voltage of the AC rotary machine and voltages on two rotation axes.

Second Embodiment

A control device for an AC rotary machine according to a second embodiment of the present invention basically has the configuration illustrated in FIG. 1. However, a difference from the first embodiment is that the AC rotary machine 1 is installed separately from the control device 106 for an AC rotary machine, and the AC rotary machine 1 is installed in a place more likely to be heated than that of the control device 106 for an AC rotary machine. For example, in the electric power steering system, the AC rotary machine 1 is installed in an engine compartment of the vehicle, and the control device for an AC rotary machine is installed near a driver's seat.

Further, the AC rotary machine 1 in the second embodiment is, for example, a synchronous motor, and is used under an operating condition that causes a large amount of continuous current to flow. For example, an electric power steering system for assisting in stationary steering when the vehicle is stopped is used under an operating condition that causes a large amount of continuous current to flow.

In the second embodiment, the adaptive observer 6 serving as a velocity estimation unit is configured to calculate the estimated velocity of the AC rotary machine 1 by replacing the model resistance value R of Expressions (3) to (14) with the estimated resistance value Rest, which is an output of the resistance value estimation unit 10. The resistance value estimation unit 10 has the configuration of FIG. 2 similarly to the first embodiment.

In the second embodiment, the AC rotary machine 1 is installed separately from the control device for an AC rotary machine, and the AC rotary machine 1 is installed in a place more likely to be heated than that of the control device for an AC rotary machine. Accordingly, the temperature difference between the temperature of the AC rotary machine and the detected temperature Tecu is large.

Further, a large amount of continuous current flows, and thus the temperature rise of the AC rotary machine 1 due to the current flow is large. This large temperature rise of the AC rotary machine 1 results in a large temperature difference between the temperature of the AC rotary machine 1 and the detected temperature Tecu.

Figure 7:
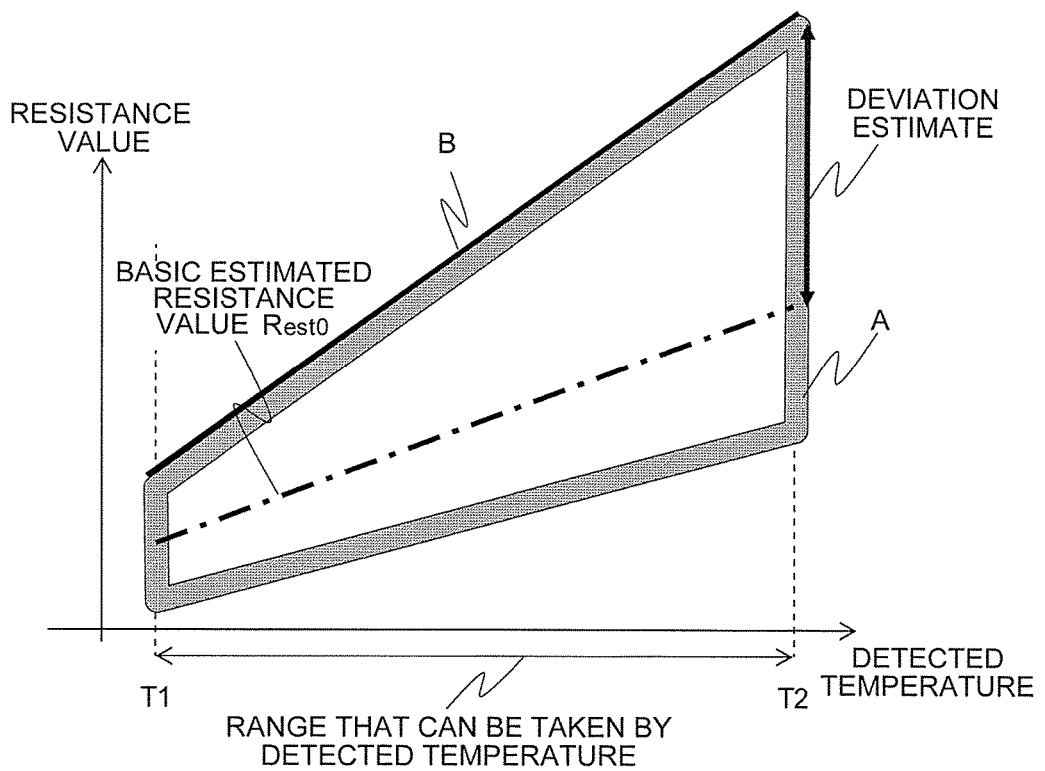
FIG. 7 is a graph for showing an example of a deviation estimate according to the second embodiment of the present invention.

In view of this, when the range that can be taken by the actual resistance value of FIG. 3 is projected two dimensionally with the horizontal axis taken as the detected temperature, the range that can be taken by the actual resistance value is shown as a range enclosed by the line A of FIG. 7.

For example, an object having an upper limit of the range of an individual difference, which is, for example, larger than a central value of the actual resistance value Rreal, takes a value of the line B of FIG. 7. In this case, the deviation estimate of the second embodiment is a value estimated in advance as the upper limit of the range that can be taken by the deviation $\Delta R$ obtained by subtracting the basic estimated resistance value Rest0 from the actual resistance value Rreal. In other words, the deviation estimate is a positive resistance value error whose absolute value is the largest within the range that can be taken by the detected temperature Tecu.

In FIG. 7, the deviation estimate can be calculated based on Expression (25) with T2, which is the upper limit of the range that can be taken by the detected temperature Tecu, as the detection temperature for estimating the deviation. The range that can be taken by the detected temperature Tecu may be the temperature range of the space in which the control device for an AC rotary machine is installed, or may be temperature that can be detected by the temperature detection unit 9. The temperature difference ΔTme is obtained based on the upper limit or lower limit of the rotary machine temperature range for the deviation estimate, which is the range of temperature that can be taken by the temperature of the AC rotary machine 1, at the detection temperature for estimating the deviation. Further, Qm and Qecu, which represent the individual differences, may be obtained by substituting the upper limit or lower limit of the range that can be taken by the individual difference into those values.

In FIG. 7 shown in this description, the deviation estimate is calculated with the one upper limit of the range that can be taken by the detected temperature as the detection temperature for estimating the deviation. However, the detection temperature for estimating the deviation is not limited to be the upper limit of the range that can be taken by the detected temperature Tecu depending on the relationship between the actual resistance value Rreal and the basic estimated resistance value Rest0. Therefore, based on the detection temperature for estimating the deviation, which is obtained by extracting one or a plurality of points from the range that can be taken by the detected temperature Tecu, the upper limit of the range that can be taken by the deviation obtained by subtracting the basic estimated resistance value Rest0 from the actual resistance value Rreal is estimated in advance based on Expression (25). At this time, as represented by Expression (24) shown in the first embodiment, when the actual resistance value Rreal is proportional to temperature, the upper limit of the range that can be taken by the deviation is the value of the upper limit or lower limit of the range that can be taken by the detected temperature Tecu.

Figure 8:
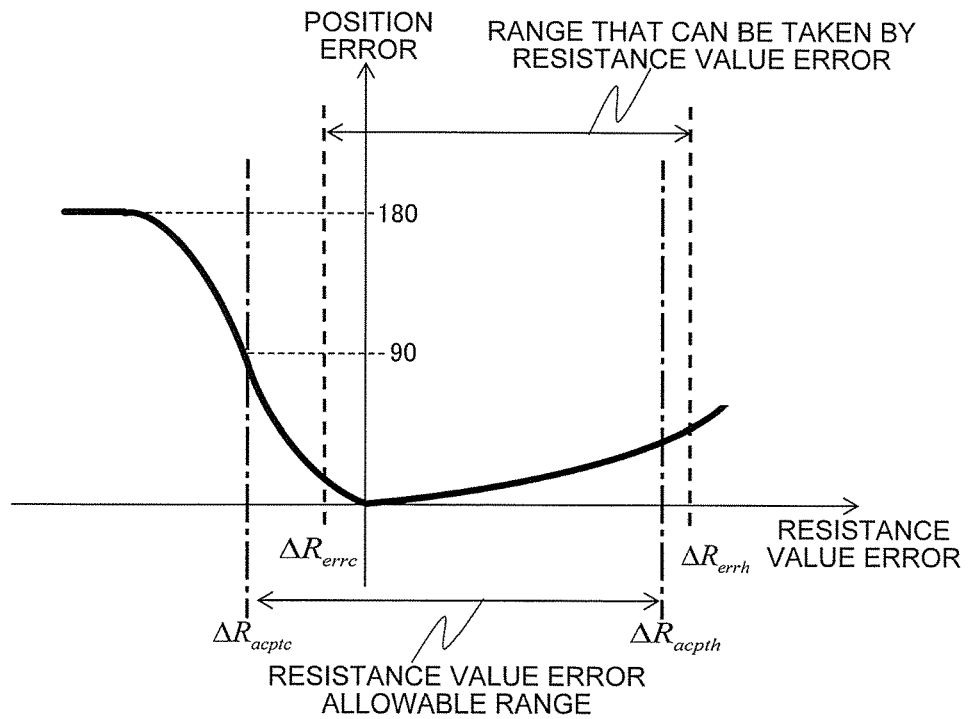
FIG. 8 is a graph for showing a resistance value error allowable range and a range that can be taken by the resistance value error according to the second embodiment of the present invention, and is a graph for showing an example of a range that can be taken by the deviation between the actual resistance value and the basic estimated resistance value.

Next, the resistance value error allowable range is determined based on the basic characteristic with respect to the position error. FIG. 8 is a graph for showing the range that can be taken by the deviation and the resistance value error allowable range in the second embodiment together with the basic characteristic with respect to the position error of FIG. 11. The range that can be taken by the resistance value error of FIG. 8 has the same meaning as the range that can be taken by the deviation between the actual resistance value Rreal and the basic estimated resistance value Rest0.

The resistance value error allowable range is a range of the resistance value error ΔR in which the AC rotary machine 1 can be rotated smoothly. Thus, the lower limit Racptc of the resistance value error allowable range is set as the smallest resistance value error that enables the AC rotary machine 1 to be rotated smoothly without its position being fixed, and the upper limit Racpth of the resistance value error allowable range is set as the largest resistance value error that enables the magnitude of vibration to fall within a predetermined range. The manner of evaluating the magnitude of vibration is not particularly defined, and the magnitude of vibration may be evaluated by a magnitude of velocity change, or may be evaluated by a magnitude of torque change.

Figure 9:
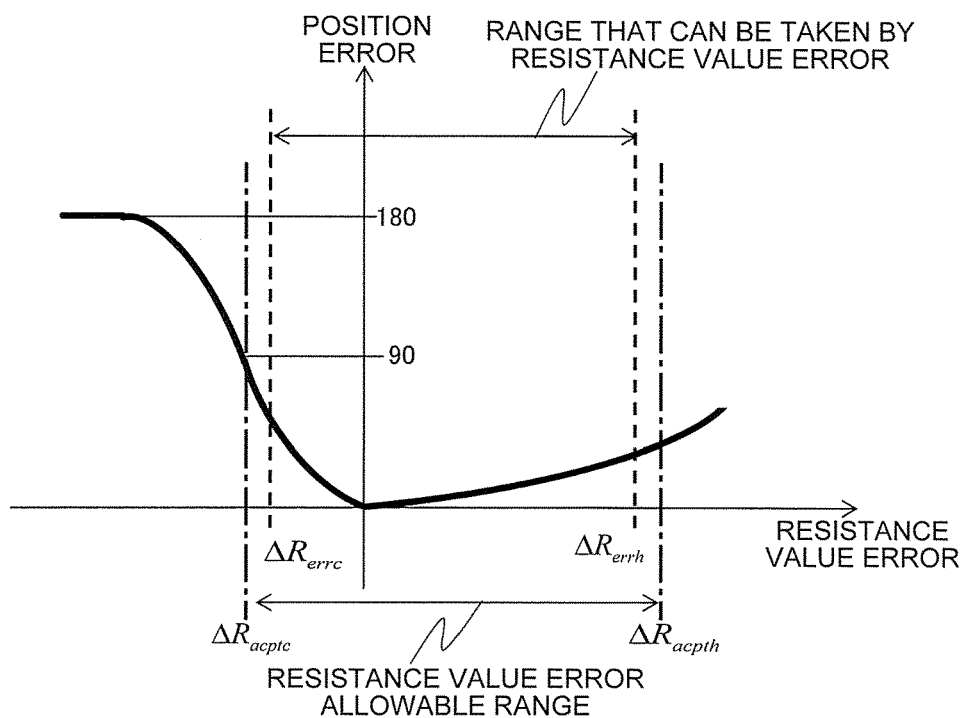
FIG. 9 is a graph for showing the resistance value error allowable range and the range that can be taken by the resistance value error according to the second embodiment of the present invention, and is a graph for showing an example of a range that can be taken by the resistance value error between the actual resistance value and the estimated resistance value.

In this case, the estimated resistance correction value Radd is a positive value satisfying the condition of Expression (29), the condition indicating that the estimated resistance correction value Radd has an absolute value that is larger than a difference between the upper limit value of the resistance value error allowable range and the deviation estimate, and is smaller than the absolute value of the deviation estimate. Through setting of the estimated resistance correction value Radd as a value satisfying Expression (29), the range that can be taken by the resistance value error ΔR, which is a difference between the actual resistance value Rreal of the AC rotary machine 1 and the estimated resistance value Rest, can be caused to fall within the resistance value error allowable range, as shown in FIG. 9. Thus, it is possible to cause the AC rotary machine 1 to be rotated smoothly while suppressing vibration of the position of the AC rotary machine 1.

[Math. 15]

$$|\Delta R_{acpth} - \Delta R_{errh}| \le |R_{add}| \le |\Delta R_{errh}| \qquad (29)$$

Further, giving the estimated resistance correction value Radd as Expression (30) based on the left side of Expression (29) prevents the resistance value error ΔR from becoming larger than is necessary in a negative direction, and thus it is possible to cause the AC rotary machine to be rotated smoothly without the position of the AC rotary machine 1 being fixed.

[Math. 16]

$$|R_{add}| = |\Delta R_{acpth} - \Delta R_{errh}| \qquad (30)$$

Further, the margin Rmargin may be added to the estimated resistance correction value Radd as represented by Expression (31) as long as the condition of Expression (29) is satisfied. In this case, it is possible to cause the AC rotary machine 1 to be rotated smoothly without the position of the AC rotary machine 1 being fixed by setting the value of the given margin to the minimum.

[Math. 17]

$$|R_{add}| = |\Delta R_{acpth} - \Delta R_{errh}| (+|R_{m\ arg\ in}|) \qquad (31)$$

Through estimation of the velocity (w) and the position (th0) with use of the estimated resistance value (Rest), which is obtained by adding the resistance correction value (Radd) determined as described above to the basic estimated resistance value (Rest0), it is possible to reduce the positive direction error for suppression of vibration and prevent the position of the AC rotary machine 1 from being fixed without causing the negative direction error to become larger than is necessary. Therefore, it is possible to cause the AC rotary machine to be rotated smoothly.

Similarly to the first embodiment, a feature of the second embodiment also resides in the resistance value estimation unit 10 configured to calculate the estimated resistance value Rest from the detected temperature Tecu, which is the external temperature of the AC rotary machine 1. Therefore, the method of estimating a specific velocity and position described in the second embodiment is only an example, and is not limited thereto. In other words, the velocity and position may be calculated in an arbitrary manner as long as the velocity and position are estimated based on the estimated resistance value Rest. For example, the calculation may be conducted as disclosed in Patent Literature 1.

Further, in the second embodiment, the AC rotary machine 1 is installed separately from the control device for an AC rotary machine, and the AC rotary machine 1 is installed in a place more likely to be heated than that of the control device for an AC rotary machine. However, the configuration is not limited to such a configuration of the control device for an AC rotary machine and the AC rotary machine as long as the upper limit of the resistance value error is positive and has a large absolute value. For example, there may be employed a configuration in which the control device for an AC rotary machine and the AC rotary machine 1 are integrated, a large amount of continuous current flows, and the temperature of the AC rotary machine 1 becomes higher than the detected temperature.

As described above, according to the second embodiment of the present invention, there is provided a control device for an AC rotary machine including: a temperature detection unit configured to detect an external temperature of the AC rotary machine, and to output the detected external temperature; and a resistance value estimation unit configured to estimate, based on the detected external temperature, an actual resistance value of the AC rotary machine, which changes depending on temperature of the AC rotary machine, and to output an estimated resistance value, in which the resistance value estimation unit is configured to calculate a basic estimated resistance value, which is a sum of a first resistance value defined as a fixed value and a second resistance value that is proportional to the detected external temperature, and to calculate the estimated resistance value by adding an estimated resistance correction value to the basic estimated resistance value. As a result, it is possible to estimate the actual resistance value, which changes depending on temperature, with a simple configuration.

The estimated resistance correction value is a positive value having an absolute value that is larger than the difference between the upper limit value of the resistance value error allowable range and the deviation estimate, and is smaller than the absolute value of the deviation estimate. The deviation estimate is a value estimated in advance as the upper limit of the range that has a possibility of being taken by the deviation obtained by subtracting the basic estimated resistance value from the actual resistance value. With this, it is possible to cause the upper limit of the range that can be taken by the resistance value estimation error obtained by subtracting the estimated resistance value from the actual resistance value to be smaller than the upper limit value of the resistance value error allowable range, and it is also possible to prevent the lower limit of the range that can be taken by the resistance value estimation error from becoming smaller than is necessary.

The deviation estimate can be calculated based on the detection temperature for estimating the deviation, the detection temperature being obtained by extracting one or a plurality of points from the range that has a possibility of being taken by the detected temperature, the temperature difference between the detected temperature and the temperature of winding of the AC rotary machine, and the range that has a possibility of being taken by the individual difference of the actual resistance value.

The temperature difference between the detected temperature and the temperature of winding of the AC rotary machine is obtained based on the upper limit or lower limit of the rotary machine temperature range for the deviation estimate, which is the range of temperature that can be taken by the temperature of the AC rotary machine, at the detection temperature for estimating the deviation. In other words, the deviation estimate is the value that is based on the upper limit or lower limit of the rotary machine temperature range for the deviation estimate, which is the range of temperature that can be taken by the temperature of the AC rotary machine, at the detection temperature for estimating the deviation.

With the configuration described above, an effect of rotating the AC rotary machine smoothly can be exhibited by setting the resistance value error allowable range as a range of the resistance value error in which the AC rotary machine can be rotated smoothly, and applying a voltage to the AC rotary machine with the current supply unit configured to, based on the estimated resistance value, apply an alternating voltage to the AC rotary machine based on a phase of the alternating voltage of the AC rotary machine and voltages on two rotation axes.

Third Embodiment

A third embodiment of the present invention relates to an electric power steering system including a control device for an AC rotary machine, which has a configuration including an instruction generation unit 11 in the configuration illustrated in FIG. 1 according to the first and second embodiments, and an AC rotary machine. The configuration of the electric power steering system is illustrated in FIG. 10.

Figure 10:
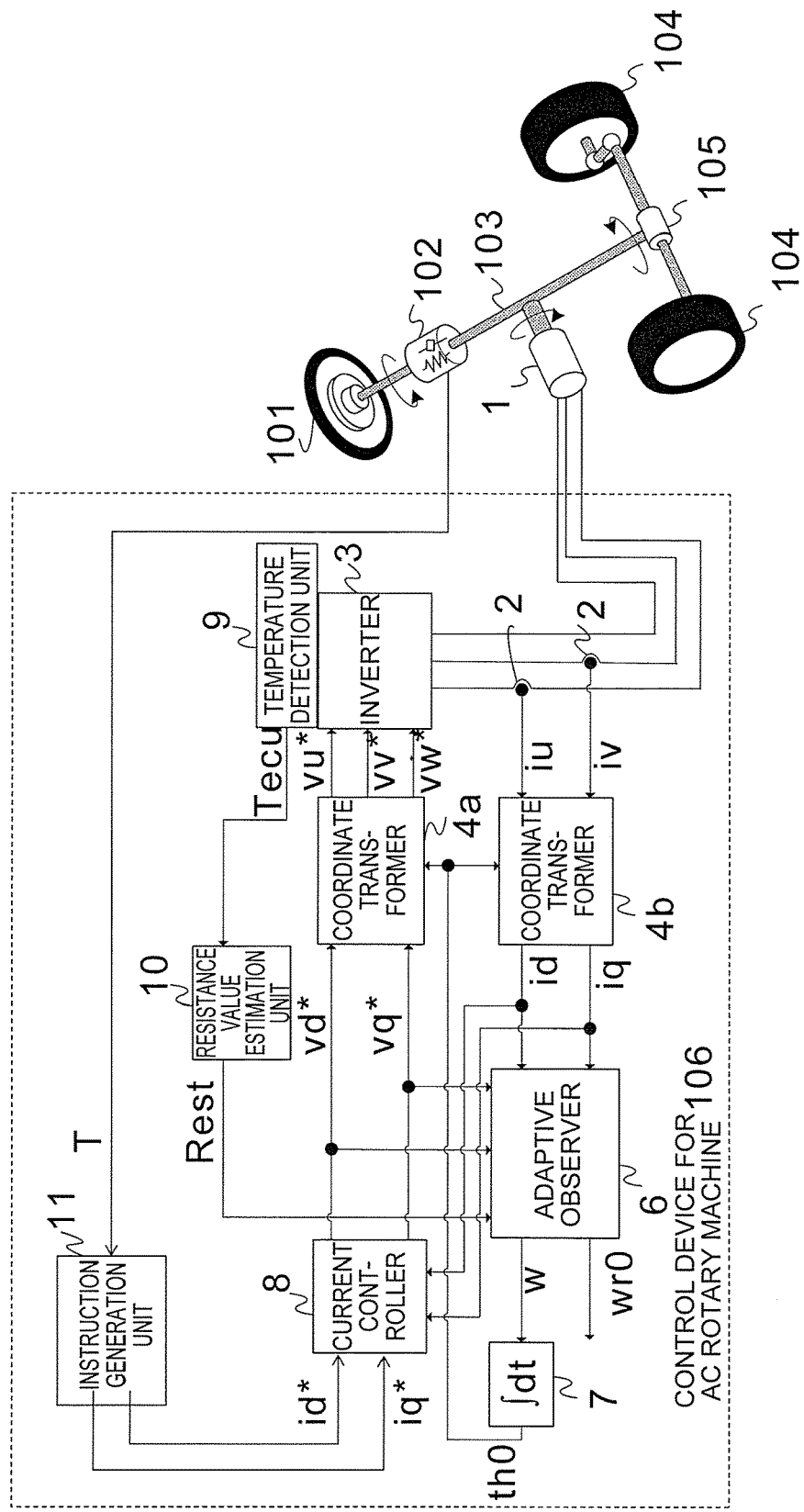
FIG. 10 is a diagram for illustrating an example of a configuration of an electric power steering system according to a third embodiment of the present invention.

In FIG. 10, the electric power steering system includes a steering wheel 101, a steering shaft 103, a rack and pinion gear 105, wheels 104, the AC rotary machine 1, the control device 106 for an AC rotary machine, and a torque detector 102. A steering mechanism including the steering wheel 101, the steering shaft 103, the rack and pinion gear 105, the wheels 104, and the torque detector 102 corresponds to a load apparatus of the AC rotary machine 1.

In FIG. 10, a steering torque applied to the steering wheel 101 by a driver (not shown) is transmitted to a rack through a torsion bar of the torque detector 102, the steering shaft 103, and the rack and pinion gear 105, to thereby steer the wheels 104.

In the third embodiment, as illustrated in FIG. 10, the calculation unit of the control device 106 for an AC rotary machine includes the instruction generation unit 11 configured to calculate the d-axis current instruction id* and the q-axis current instruction iq* based on a steering torque T detected by the torque detector 102. Further, a voltage is applied to the AC rotary machine 1 from the inverter 3 based on the phase currents iu and iv of the AC rotary machine 1.

The output torque generated by the AC rotary machine 1 is transmitted to the steering shaft 103, and alleviates a load of the steering torque applied by the driver at the time of steering.

Regarding the electric power steering system of FIG. 10, in the case of the first embodiment, for example, the control device 106 for an AC rotary machine and the AC rotary machine 1 are integrated, and the AC rotary machine 1 is used under an operating condition that causes a small amount of continuous current to flow. Further, in the case of the second embodiment, for example, the control device 106 for an AC rotary machine is installed separately from the AC rotary machine 1, and the AC rotary machine 1 is installed in a place more likely to be heated than that of the control device 106 for an AC rotary machine. In addition, the AC rotary machine 1 is used under an operating condition that causes a large amount of continuous current to flow.

With the configuration described above, the AC rotary machine can be rotated smoothly by applying a voltage to the AC rotary machine 1 based on the estimated resistance value calculated by the resistance value estimation unit 10. Therefore, it is possible to obtain an electric power steering system that can achieve smooth steering.

In the embodiments described above, a description is given of a control device configured to control the AC rotary machine based on the phase of an alternating voltage of the AC rotary machine that conforms to the estimated resistance value of the AC rotary machine. However, in the following, a description is given of a case corresponding to each embodiment, in which the phase of an alternating current of the AC rotary machine is not calculated from the estimated resistance value.

The first and fifth embodiments solve fixation of the position of the AC rotary machine, and the first embodiment deals with a case in which the estimated resistance correction value is a negative value having an absolute value that is larger than a difference between the lower limit value of the resistance value error allowable range and the deviation estimate, and is smaller than the absolute value of the deviation estimate, whereas the fifth embodiment deals with a case in which the estimated resistance correction value is a positive value having an absolute value that is larger than a difference between the upper limit value of the resistance value error allowable range and the deviation estimate, and is smaller than the absolute value of the deviation estimate.

Further, the second and fourth embodiments solve the vibration of the AC rotary machine, and the second embodiment deals with a case in which the estimated resistance correction value is a positive value having an absolute value that is larger than a difference between the upper limit value of the resistance value error allowable range and the deviation estimate, and is smaller than the absolute value of the deviation estimate, whereas the fourth embodiment deals with a case in which the estimated resistance correction value is a negative value having an absolute value that is larger than a difference between the lower limit value of the resistance value error allowable range and the deviation estimate, and is smaller than the absolute value of the deviation estimate.

Fourth Embodiment

Figure 18:
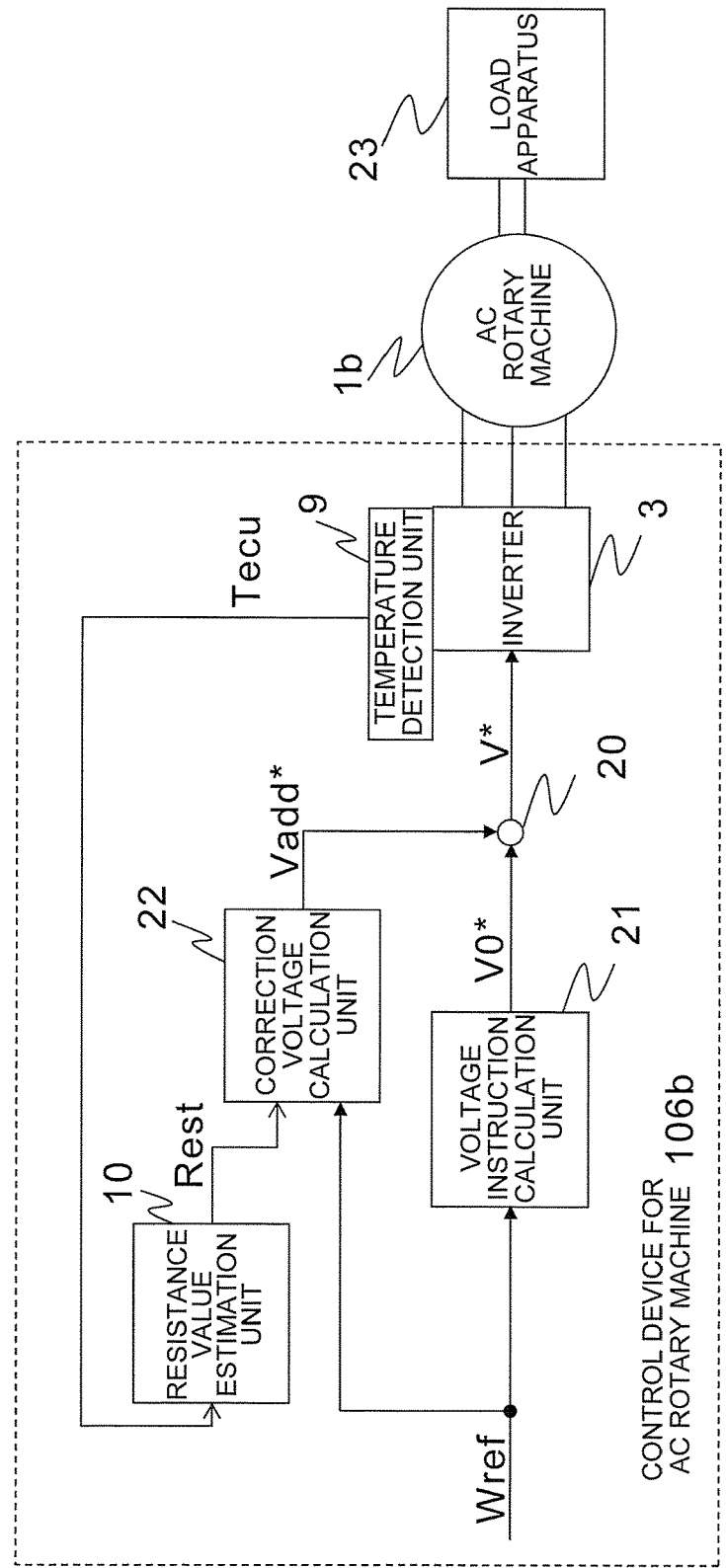
FIG. 18 is a diagram for illustrating an example of a configuration of a control device for an AC rotary machine according to fourth and fifth embodiments of the present invention.

FIG. 18 is a diagram for illustrating an example of the configuration of a control device for an AC rotary machine according to a fourth embodiment of the present invention. In FIG. 18, an AC rotary machine 1b to be controlled and a load apparatus 23 are illustrated in addition to a control device 106b for an AC rotary machine, and the control device 106b for the AC rotary machine and the AC rotary machine 1 are integrated. Further, the AC rotary machine 1b is an induction motor, and is used under an operating condition that causes a small amount of continuous current to flow.

The temperature detection unit 9 is installed on the board of the inverter 3, and is configured to detect the external temperature of the AC rotary machine 1b and to output the detected temperature Tecu. The range that can be taken by the detected temperature Tecu is between the lower limit T1 and the upper limit T2.

The resistance value estimation unit 10 is configured to estimate the actual resistance value Rreal of the AC rotary machine 1b based on the detected temperature Tecu, and to output the estimated resistance value Rest. The estimated resistance value Rest is represented by Expression (16).

A voltage instruction calculation unit 21 is configured to calculate a voltage instruction V0* based on a velocity instruction Wref(*).

A correction voltage calculation unit 22 is configured to calculate a correction voltage (instruction) Vadd* based on the velocity instruction Wref and the estimated resistance value Rest serving as the model resistance value R. The inverter 3 is configured to apply an alternating current to the AC rotary machine 1b based on a corrected voltage instruction V* output from an adder 20, which is a sum of the voltage instruction V0* and a correction voltage Vadd*.

The load apparatus 23 is configured to serve as a load that acts depending on the torque generated by the AC rotary machine 1b.

Now, a description is given of a problem in that, in the configuration of the fourth embodiment, when there is a resistance value error between the actual resistance value Rreal of the AC rotary machine 1b and the model resistance value R, the AC rotary machine 1b cannot be rotated smoothly.

Figure 19:
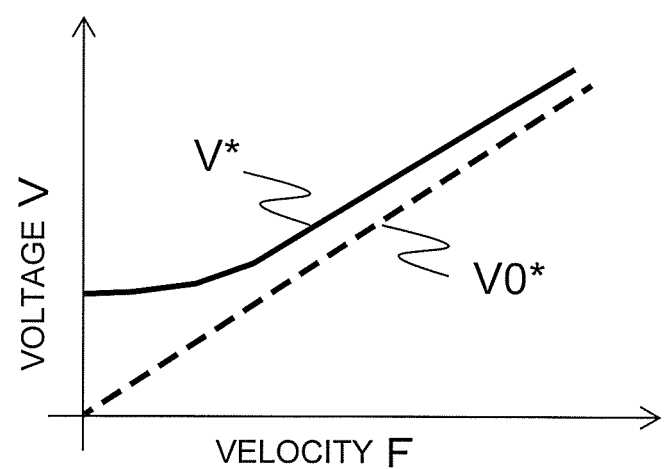
FIG. 19 is a graph for showing a relationship between a voltage V and a velocity F in V/F control according to the fourth and fifth embodiments of the present invention.

As disclosed in Patent Literature 4 and Patent Literature 5, regarding an induction motor, there is generally known V/F control, which is a control method for keeping a relationship between a velocity F and a voltage V constant as shown by V0* of FIG. 19. When a voltage equation is considered under an ideal condition without the resistance value, the voltage instruction V0* may be given by V0* of Expression (32). The voltage instruction V0* is calculated with the velocity instruction Wref, namely, a value proportional to the velocity F with a proportional constant kv.

[Math. 18]

$$V_0^* = k_v W_{ref} \tag{32}$$

However, in actuality, a voltage drop occurs due to the actual resistance value Rreal of the AC rotary machine 1b and a current I. Thus, the required voltage V is represented by Expression (33).

[Math. 19]

$$V = R_{real} I + k_v W_{ref} \tag{33}$$

Because of this, a voltage equivalent to a difference between Expression (32) and Expression (33), namely, the amount of voltage drop due to the resistance value is insufficient. In order to compensate for this insufficiency, the correction voltage (instruction) Vadd* is calculated based on the model resistance value R, and the correction voltage Vadd* is added (boosting) to the voltage instruction V0* to obtain the corrected voltage instruction V* (V* may simply be referred to as "voltage instruction").

[Math. 20]

$$V^* = V_0^* + V_{add}^* \tag{34}$$

The correction voltage Vadd* is given by Expression (35) based on the model resistance value R. The proportional constant kadd may be a constant value, or may be a value that is variable depending on the velocity instruction Wref, namely, the velocity F. The corrected voltage instruction V* of FIG. 19 is an example of the correction voltage Vadd*, which is given with the proportional constant kadd being a value that is variable depending on the velocity instruction Wref, namely, the velocity F, being added to the voltage instruction V0*. In this description, the correction voltage Vadd* is given by a proportional expression like Expression (35). However, the expression is not limited to the proportional expression of Expression (35) because the effect of the resistance value part according to the present invention is exhibited as long as the correction voltage Vadd* is based on the model resistance value R.

[Math. 21]

$$V_{add}^* = k_{add} R \tag{35}$$

A voltage error ΔV between the correction voltage Vadd* calculated based on the model resistance value R and an actually required correction voltage that is based on the actual resistance value Rreal of the AC rotary machine 1b is represented by Expression (36).

[Math. 22]

$$\Delta V = k_{add}R - k_{add}R_{real} = k_{add}(R - R_{real}) = -k_{add}(R_{real} - R) \quad (36)$$

Based on Expression (36), when the correction voltage Vadd* is large, that is, when the model resistance value R is larger than the actual resistance value Rreal, the voltage error ΔV is a positive value. Further, the magnetic flux ϕ of the AC rotary machine 1b is proportional to an applied voltage, and thus when the voltage error ΔV is a positive value, the magnetic flux ϕ is large. Further, the output torque of the AC rotary machine 1b is proportional to the magnetic flux ϕ, and thus the large magnetic flux ϕ causes a large output torque. When the output torque is larger than is necessary, an excessive step input is applied especially at the time of start from zero speed, resulting in a problem in that resonance vibration is excited in a mechanical system of the load apparatus 23.

On the other hand, when the correction voltage Vadd* is small, that is, when the model resistance value R is smaller than the actual resistance value Rreal, the voltage error ΔV is a negative value. When the voltage error ΔV is a negative value, the magnetic flux ϕ of the AC rotary machine 1b is small, and the output torque of the AC rotary machine 1b is also small. When the output torque is small and insufficient, there is a problem in that the AC rotary machine 1b cannot be rotated due to an insufficient torque especially at the time of start from zero speed.

As described above, there is a problem in that an excessive or insufficient output torque of the AC rotary machine 1b is caused due to the resistance value error, thereby preventing the AC rotary machine 1b from being rotated smoothly. The present invention is configured to enable the AC rotary machine 1b to be rotated smoothly by estimating the resistance value with the temperature detection unit 9 and the resistance value estimation unit 10 and replacing the model resistance value R with the estimated resistance value Rest so as to calculate the correction voltage Vadd*.

Figure 20:
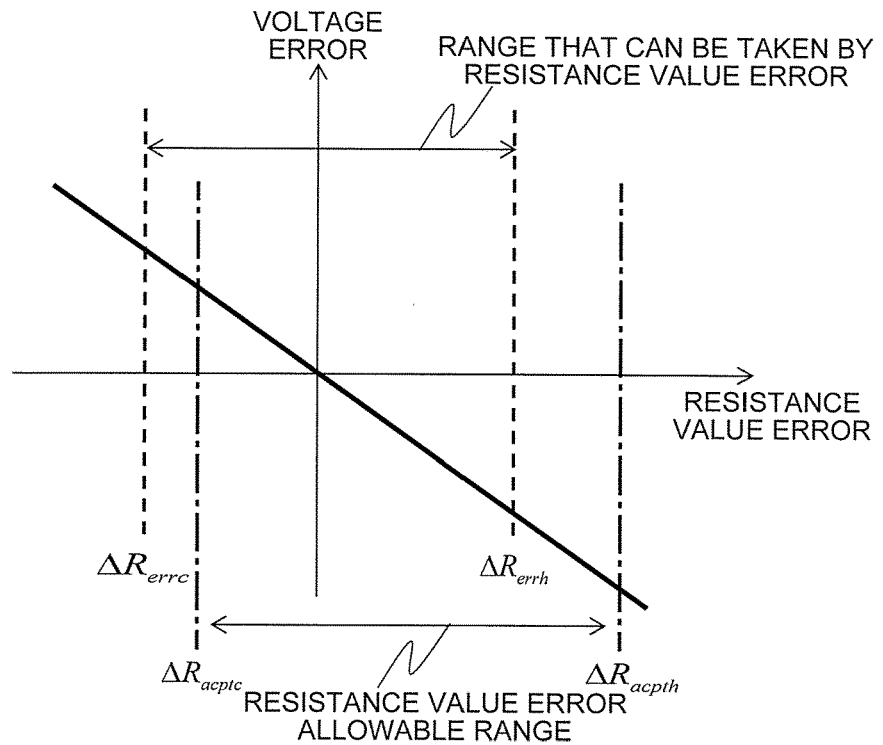
FIG. 20 is a graph for showing an example of a relationship between the resistance value error and a voltage error according to the fourth embodiment of the present invention.

A range of the resistance value error ΔR in which the AC rotary machine 1b can be rotated smoothly is set as the resistance value error allowable range. FIG. 20 is a graph for showing an example of a relationship between the resistance value error ΔR and the voltage error ΔV. The phrase "the AC rotary machine 1b can be rotated smoothly" means the following two things. First, a torque necessary for rotating the AC rotary machine 1b can be output, that is, the resistance value error ΔR is equal to or less than ΔRacpth, where the voltage error ΔV is a threshold value or more. Second, the magnitude of vibration is in an allowable range, that is, the resistance value error ΔR is equal to or larger than ΔRacptc, where the voltage error ΔV is a threshold value or less. In this case, ΔRacptc is the lower limit of the resistance value error allowable range, and ΔRacpth is the upper limit of the resistance value error allowable range. The manner of evaluating the magnitude of vibration is not particularly defined, and the magnitude of vibration may be evaluated based on the magnitude of velocity change, or may be evaluated based on the magnitude of torque change.

In the fourth embodiment, similarly to the first embodiment of the present invention, the control device for an AC rotary machine is integrated with the AC rotary machine 1, and is used under an operating condition that causes a small amount of continuous current to flow. Thus, similarly to the first embodiment of the present invention, the range that can be taken by the actual resistance value of the AC rotary machine is within the range enclosed by the line A of FIG. 4. For example, an object having the lower limit of the range of an individual difference, e.g., a value that is smaller than a central value of the actual resistance value, takes a value of the line B of FIG. 4.

Based on FIG. 4, the range that can be taken by the deviation ΔR between the actual resistance value Rreal of the AC rotary machine and the basic estimated resistance value Rest0 is between ΔRerrc and ΔRerrh of FIG. 20, and the value is given by Expression (25).

The deviation estimate of the fourth embodiment is a value estimated in advance as the lower limit of the range that can be taken by the deviation obtained by subtracting the basic estimated resistance value Rest0 from the actual resistance value Rreal. In other words, the deviation estimate is a negative resistance value error ΔR whose absolute value is the largest within the range that can be taken by the detected temperature Tecu.

In FIG. 4, the deviation estimate can be calculated based on Expression (25) with T2, which is the upper limit of the range that can be taken by the detected temperature Tecu, as the detection temperature for estimating the deviation. The range that can be taken by the detected temperature Tecu may be the temperature range of the space in which the control device for an AC rotary machine is installed, or may be temperature that can be detected by the temperature detection unit 9. The temperature difference ΔTme is obtained based on the upper limit or lower limit of the rotary machine temperature range for the deviation estimate, which is the range of temperature that can be taken by the temperature of the AC rotary machine 1b, at the detection temperature for estimating the deviation. Further, Qm and Qecu, which represent the individual differences, may be obtained by substituting the upper limit or lower limit of the range that can be taken by the individual difference into those values.

In FIG. 4 shown in this description, the deviation estimate is calculated with the one upper limit of the range that can be taken by the detected temperature Tecu as the detection temperature for estimating the deviation. However, the detection temperature for estimating the deviation is not limited to be the upper limit of the range that can be taken by the detected temperature depending on the relationship between the actual resistance value and the basic estimated resistance value. Therefore, based on the detection temperature for estimating the deviation, which is obtained by extracting one or a plurality of points from the range that can be taken by the detected temperature, the lower limit of the range that can be taken by the deviation obtained by subtracting the basic estimated resistance value from the actual resistance value is estimated in advance based on Expression (25). At this time, as represented by Expression (24), when the actual resistance value is proportional to temperature, the lower limit of the range that can be taken by the deviation is the value of the upper limit or lower limit of the range that can be taken by the detected temperature.

Figure 21:
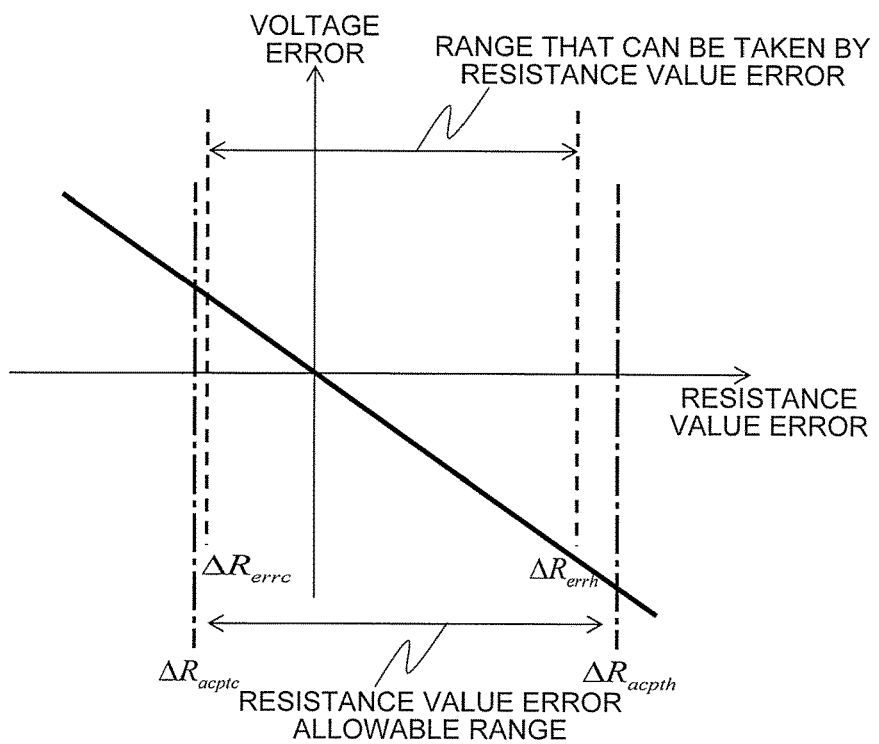
FIG. 21 is a graph for showing an example of a relationship between the resistance value error and the voltage error after an estimated resistance correction value is added according to the fourth embodiment of the present invention.

In this case, the estimated resistance correction value Radd is a negative value satisfying the condition of Expression (26), the condition indicating that the estimated resistance correction value Radd has an absolute value that is larger than the difference between the lower limit value of the resistance value error allowable range and the deviation estimate, and is smaller than the absolute value of the deviation estimate. Through setting of the estimated resistance correction value Radd as a value satisfying Expression (26), the range that can be taken by the resistance value error ΔR, which is a difference between the actual resistance value Rreal of the AC rotary machine 1b and the estimated resistance value Rest, can be caused to fall within the resistance value error allowable range, as shown in FIG. 21.

The estimated resistance correction value Radd in Expression (16), which is an expression for calculating the estimated resistance value Rest, is a positive value, and is given by Expression (27) or Expression (28) based on Expression (26) in the same manner as in the first embodiment. The negative direction error can be reduced by giving the correction voltage Vadd* with use of the estimated resistance value Rest obtained by adding the resistance correction value Radd to the basic estimated resistance value Rest0. Through reduction of the negative direction error, the vibration due to the input of an excessive torque can be suppressed, and the AC rotary machine 1$b$ can be rotated smoothly. Further, through setting of the resistance correction value Radd such that the positive direction error takes a value that is not larger than is necessary, the position of the AC rotary machine 1$b$ can be prevented from being fixed, and thus the AC rotary machine can be rotated smoothly.

In the fourth embodiment, the control device for an AC rotary machine and the AC rotary machine are integrated, and an AC rotary machine that necessitates a small amount of continuous current to flow is discussed. However, the configuration is not limited to such a configuration of the control device for an AC rotary machine and the AC rotary machine as long as the lower limit of the resistance value error is negative and has a large absolute value. For example, there may be employed a configuration in which the control device for an AC rotary machine and the AC rotary machine are installed in separate places, and the detected temperature becomes higher than the temperature of the AC rotary machine.

As described above, according to the fourth embodiment of the present invention, there is provided a control device for an AC rotary machine including: a temperature detection unit configured to detect an external temperature of the AC rotary machine, and to output the detected external temperature; and a resistance value estimation unit configured to estimate, based on the detected external temperature, an actual resistance value of the AC rotary machine, which changes depending on temperature of the AC rotary machine, and to output an estimated resistance value, in which the resistance value estimation unit is configured to calculate a basic estimated resistance value, which is a sum of a first resistance value defined as a fixed value and a second resistance value that is proportional to the detected external temperature, and to calculate the estimated resistance value by adding an estimated resistance correction value to the basic estimated resistance value. As a result, it is possible to estimate the actual resistance value, which changes depending on temperature, with a simple configuration.

The estimated resistance correction value is a negative value having an absolute value that is larger than the difference between the lower limit value of the resistance value error allowable range and the deviation estimate, and is smaller than the absolute value of the deviation estimate. The deviation estimate is a value estimated in advance as the lower limit of the range that has a possibility of being taken by the deviation obtained by subtracting the basic estimated resistance value from the actual resistance value. With this, it is possible to cause the lower limit of the range that can be taken by the resistance value estimation error obtained by subtracting the estimated resistance value from the actual resistance value to be larger than the lower limit value of the resistance value error allowable range, and it is also possible to prevent the upper limit of the range that can be taken by the resistance value estimation error from becoming larger than is necessary.

The deviation estimate can be calculated based on a detection temperature for estimating the deviation, the detection temperature being obtained by extracting one or a plurality of points from a range that has a possibility of being taken by the detected temperature, a temperature difference between the detected temperature and the temperature of winding of the AC rotary machine, and the range that has a possibility of being taken by the individual difference of the actual resistance value.

The temperature difference between the detected temperature and the temperature of winding of the AC rotary machine is obtained based on the upper limit or lower limit of the rotary machine temperature range for the deviation estimate, which is the range of temperature that can be taken by the temperature of the AC rotary machine, at the detection temperature for estimating the deviation. In other words, the deviation estimate is a value that is based on the upper limit or lower limit of the rotary machine temperature range for the deviation estimate, which is the range of temperature that can be taken by the temperature of the AC rotary machine, at the detection temperature for estimating the deviation.

With the configuration described above, an effect of rotating the AC rotary machine smoothly can be exhibited by setting the resistance value error allowable range as a range of the resistance value error in which the AC rotary machine can be rotated smoothly, and applying a voltage to the AC rotary machine based on the estimated resistance value.

Fifth Embodiment

The AC rotary machine 1$b$ and the control device 106$b$ for an AC rotary machine according to a fifth embodiment of the present invention are the same as those according to the fourth embodiment illustrated in FIG. 18. However, a difference from the fourth embodiment is that the AC rotary machine 1$b$ is installed separately from the control device 106$b$ for an AC rotary machine, and the AC rotary machine 1$b$ is installed in a place more likely to be heated than that of the control device 106$b$ for an AC rotary machine. Further, the AC rotary machine 1$b$ according to the fifth embodiment is an induction motor, and is used under an operating condition that causes a large amount of continuous current to flow.

The AC rotary machine according to the fifth embodiment is an induction motor, and the control device for an AC rotary machine has the same configuration. Thus, the voltage error $\Delta V$ is caused due to the resistance value error $\Delta R$, resulting in the same problem as that of the fourth embodiment. Specifically, based on Expression (36), when the correction voltage Vadd* is large, that is, when the model resistance value R is larger than the actual resistance value Rreal, there is a problem in that the resonance vibration is excited in the mechanical system of the load apparatus 23. In contrast, when the correction voltage Vadd* is small, that is, when the model resistance value R is smaller than the actual resistance value Rreal, there is a problem in that the AC rotary machine cannot be rotated due to an insufficient torque. As described above, there is a problem in that an excessive or insufficient output torque of the AC rotary machine is caused due to the resistance value error, thereby preventing the AC rotary machine from being rotated smoothly. The present invention is configured to enable the AC rotary machine 1$b$ to be rotated smoothly by estimating the resistance value with the temperature detection unit 9 and the resistance value estimation unit 10 and replacing the model resistance value R with the estimated resistance value Rest so as to calculate the correction voltage Vadd*.

Figure 22:
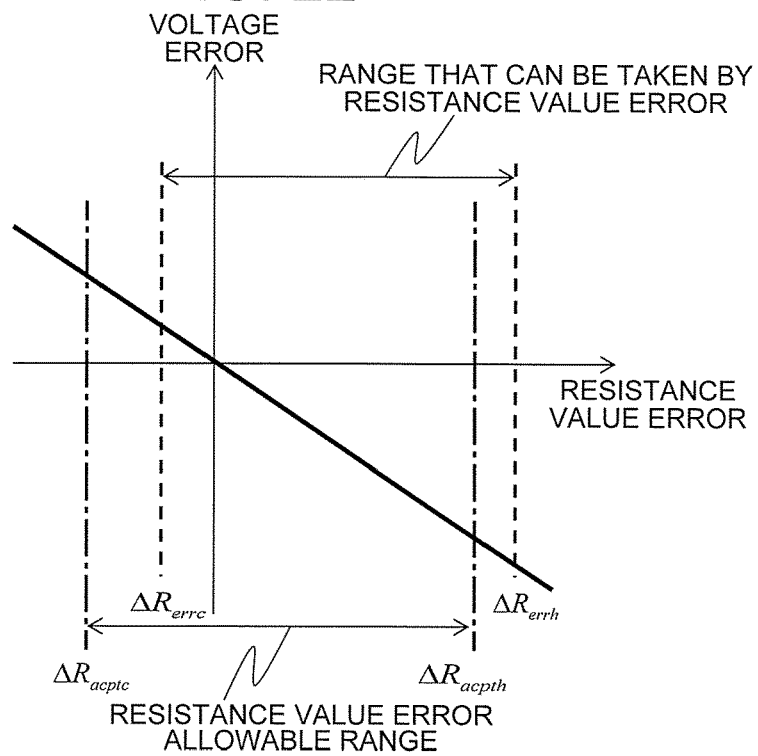
FIG. 22 is a graph for showing an example of a relationship between the resistance value error and the voltage error according to the fifth embodiment of the present invention.

The range of the resistance value error ΔR in which the AC rotary machine 1b can be rotated smoothly is set as the resistance value error allowable range. FIG. 22 is a graph for showing an example of a relationship between the resistance value error ΔR and the voltage error ΔV according to the fifth embodiment. The phrase "the AC rotary machine 1b can be rotated smoothly" means that a torque necessary for rotating the AC rotary machine can be output, that is, the voltage error ΔV is equal to or larger than the lower limit ΔRacptc of the resistance value error allowable range, and the magnitude of vibration is in an allowable range, that is, the voltage error ΔV is equal to or less than the upper limit ΔRacpth of the resistance value error allowable range. The manner of evaluating the magnitude of vibration is not particularly defined, and the magnitude of vibration may be evaluated based on the magnitude of velocity change, or may be evaluated based on the magnitude of torque change.

In the fifth embodiment, similarly to the second embodiment of the present invention, the AC rotary machine 1b is installed in a place more likely to be heated than that of the control device for an AC rotary machine. In addition, the AC rotary machine 1b is an induction motor, and is used under an operating condition that causes a large amount of continuous current to flow. Thus, similarly to the second embodiment of the present invention, the range that can be taken by the actual resistance value Rreal of the AC rotary machine is within the range enclosed by the line A of FIG. 7. Based on FIG. 7, the range that can be taken by the deviation between the actual resistance value Rreal of the AC rotary machine and the basic estimated resistance value Rest0 is between ΔRerrc and ΔRerrh of FIG. 22, and the value is given by Expression (25).

The deviation estimate of the fifth embodiment is a value estimated in advance as the upper limit of the range that can be taken by the deviation obtained by subtracting the basic estimated resistance value Rest0 from the actual resistance value Rreal. In other words, the deviation estimate is a positive resistance value error ΔR whose absolute value is the largest within the range that can be taken by the detected temperature Tecu.

In FIG. 7, the deviation estimate can be calculated based on Expression (25) with T2, which is the upper limit of the range that can be taken by the detected temperature Tecu, as the detection temperature for estimating the deviation. The range that can be taken by the detected temperature Tecu may be the temperature range of the space in which the control device for an AC rotary machine is installed, or may be temperature that can be detected by the temperature detection unit 9. The temperature difference ΔTme is obtained based on the upper limit or lower limit of the rotary machine temperature range for the deviation estimate, which is the range of temperature that can be taken by the temperature of the AC rotary machine, at the detection temperature for estimating the deviation. Further, Qm and Qecu, which represent the individual differences, may be obtained by substituting the upper limit or lower limit of the range that can be taken by the individual difference into those values.

In FIG. 7 shown in this description, the deviation estimate is calculated with the one upper limit of the range that can be taken by the detected temperature Tecu as the detection temperature for estimating the deviation. However, the detection temperature for estimating the deviation is not limited to be the upper limit of the range that can be taken by the detected temperature depending on the relationship between the actual resistance value and the basic estimated resistance value. Therefore, based on the detection temperature for estimating the deviation, which is obtained by extracting one or a plurality of points from the range that can be taken by the detected temperature, the upper limit of the range that can be taken by the deviation obtained by subtracting the basic estimated resistance value from the actual resistance value is estimated in advance based on Expression (25). At this time, as represented by Expression (24), when the actual resistance value is proportional to temperature, the upper limit of the range that can be taken by the deviation is the value of the upper limit or lower limit of the range that can be taken by the detected temperature.

Figure 23:
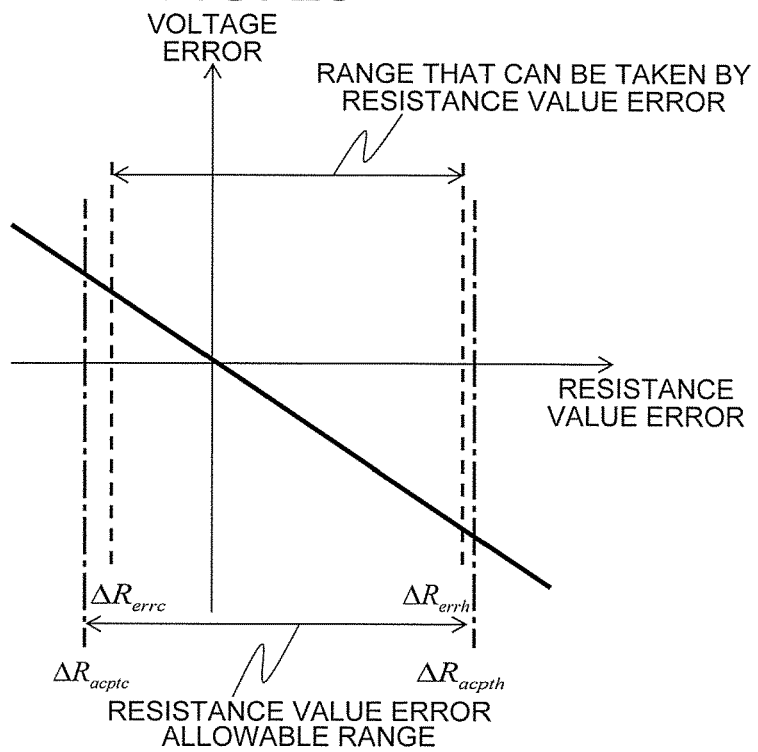
FIG. 23 is a graph for showing an example of a relationship between the resistance value error and the voltage error after the estimated resistance correction value is added according to the fifth embodiment of the present invention.

In this case, the estimated resistance correction value Radd is a negative value satisfying the condition of Expression (29), the condition indicating that the estimated resistance correction value Radd has an absolute value that is larger than a difference between the upper limit value of the resistance value error allowable range and the deviation estimate, and is smaller than the absolute value of the deviation estimate. Through setting of the estimated resistance correction value Radd as a value satisfying Expression (29), the range that can be taken by the resistance value error, which is a difference between the actual resistance value Rreal of the AC rotary machine and the estimated resistance value Rest, can be caused to fall within the resistance value error allowable range, as shown in FIG. 23.

The estimated resistance correction value Radd in Expression (16), which is an expression for calculating the estimated resistance value Rest, is a positive value, and is given by Expression (30) or Expression (31) based on Expression (29) in the same manner as in the second embodiment. The positive direction error can be reduced by giving the correction voltage Vadd* with use of the estimated resistance value Rest obtained by adding the resistance correction value Radd to the basic estimated resistance value Rest0. Through reduction of the positive direction error, a sufficient torque for rotating the AC rotary machine can be obtained and the position of the AC rotary machine can be prevented from being fixed. Thus, the AC rotary machine can be rotated smoothly. Further, through setting of the resistance correction value Radd such that the negative direction error takes a value that is not larger than is necessary, the increase in vibration can be suppressed to the minimum, and thus the AC rotary machine can be rotated smoothly.

Further, in the fifth embodiment, the AC rotary machine 1b is installed separately from the control device 106b for an AC rotary machine, and the AC rotary machine 1b is installed in a place more likely to be heated than that of the control device 106b for an AC rotary machine. However, the configuration is not limited to such a configuration of the control device for an AC rotary machine and the AC rotary machine as long as the upper limit of the resistance value error is positive and has a large absolute value. For example, there may be employed a configuration in which the control device for an AC rotary machine and the AC rotary machine 1b are integrated, a large amount of continuous current flows, and the temperature of the AC rotary machine 1b becomes higher than the detected temperature.

As described above, according to the fifth embodiment of the present invention, there is provided a control device for an AC rotary machine including: a temperature detection unit configured to detect an external temperature of the AC rotary machine, and to output the detected external temperature; and a resistance value estimation unit configured to estimate, based on the detected external temperature, an actual resistance value of the AC rotary machine, which changes depending on temperature of the AC rotary machine, and to output an estimated resistance value, in which the resistance value estimation unit is configured to calculate a basic estimated resistance value, which is a sum of a first resistance value defined as a fixed value and a second resistance value that is proportional to the detected external temperature, and to calculate the estimated resistance value by adding an estimated resistance correction value to the basic estimated resistance value. As a result, it is possible to estimate the actual resistance value, which changes depending on temperature, with a simple configuration.

The estimated resistance correction value is a positive value having an absolute value that is larger than the difference between the upper limit value of the resistance value error allowable range and the deviation estimate, and is smaller than the absolute value of the deviation estimate. The deviation estimate is a value estimated in advance as the upper limit of the range that has a possibility of being taken by the deviation obtained by subtracting the basic estimated resistance value from the actual resistance value. With this, it is possible to cause the upper limit of the range that can be taken by the resistance value estimation error obtained by subtracting the estimated resistance value from the actual resistance value to be smaller than the upper limit value of the resistance value error allowable range, and it is also possible to prevent the lower limit of the range that can be taken by the resistance value estimation error from becoming smaller than is necessary.

The deviation estimate can be calculated based on a detection temperature for estimating the deviation, the detection temperature being obtained by extracting one or a plurality of points from a range that has a possibility of being taken by the detected temperature, a temperature difference between the detected temperature and the temperature of winding of the AC rotary machine, and the range that has a possibility of being taken by the individual difference of the actual resistance value.

The temperature difference between the detected temperature and the temperature of winding of the AC rotary machine is obtained based on the upper limit or lower limit of the rotary machine temperature range for the deviation estimate, which is the range of temperature that can be taken by the temperature of the AC rotary machine, at the detection temperature for estimating the deviation. In other words, the deviation estimate is a value that is based on the upper limit or lower limit of the rotary machine temperature range for the deviation estimate, which is the range of temperature that can be taken by the temperature of the AC rotary machine, at the detection temperature for estimating the deviation.

With the configuration described above, an effect of rotating the AC rotary machine smoothly can be exhibited by setting the resistance value error allowable range as a range of the resistance value error in which the AC rotary machine can be rotated smoothly, and applying a voltage to the AC rotary machine based on the estimated resistance value.

Sixth Embodiment

A sixth embodiment of the present invention relates to an electric power steering system including a control device for an AC rotary machine, which has a configuration including an instruction generation unit 11b in the configuration illustrated in FIG. 18 according to the fourth and fifth embodiments, and an AC rotary machine. The configuration of the electric power steering system is illustrated in FIG. 24.

Figure 24:
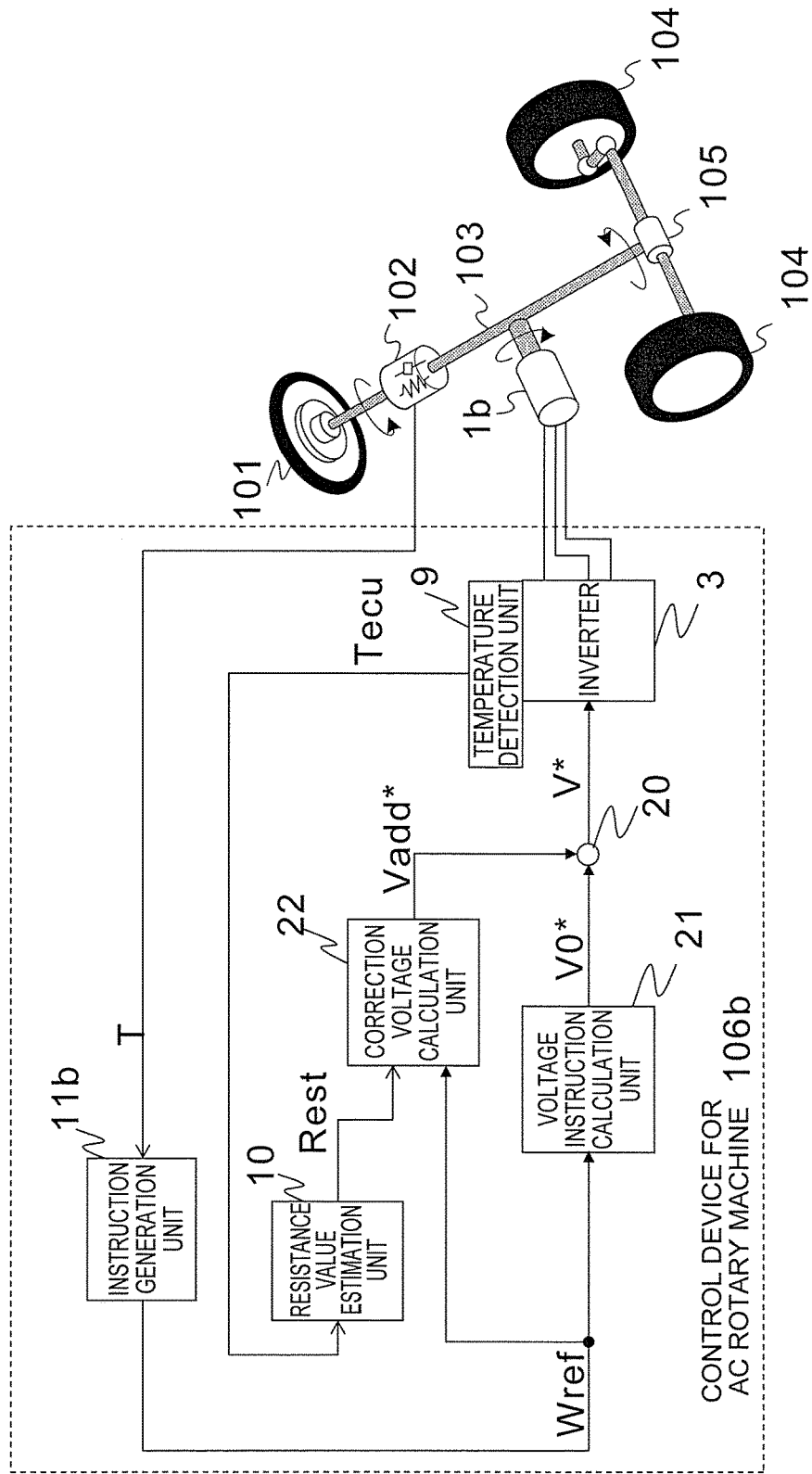
FIG. 24 is a diagram for illustrating an example of a configuration of an electric power steering system according to a sixth embodiment of the present invention.

In FIG. 24, the electric power steering system includes the steering wheel 101, the steering shaft 103, the rack and pinion gear 105, the wheels 104, the AC rotary machine 1b, the control device 106b for an AC rotary machine, and the torque detector 102. A steering mechanism including the steering wheel 101, the steering shaft 103, the rack and pinion gear 105, the wheels 104, and the torque detector 102 corresponds to the load apparatus 23 of FIG. 18.

In FIG. 24, a steering torque applied to the steering wheel 101 by the driver (not shown) is transmitted to the rack through the torsion bar of the torque detector 102, the steering shaft 103, and the rack and pinion gear 105, to thereby steer the wheels 104.

In the sixth embodiment, as illustrated in FIG. 24, the calculation unit of the control device 106b for an AC rotary machine includes the instruction generation unit 11b configured to calculate the velocity command Wref based on the steering torque T detected by the torque detector 102. Further, a voltage is applied to the AC rotary machine 1b from the inverter 3 based on the current flowing through the AC rotary machine 1b.

The output torque generated by the AC rotary machine 1b is transmitted to the steering shaft 103, and alleviates a load of the steering torque applied by the driver at the time of steering.

Regarding the electric power steering system of FIG. 24, in the case of the fourth embodiment, for example, the control device 106b for an AC rotary machine and the AC rotary machine 1b are integrated, and the AC rotary machine 1b is used under an operating condition that causes a small amount of continuous current to flow. Further, in the case of the fifth embodiment, for example, the control device 106b for an AC rotary machine is installed separately from the AC rotary machine 1b, and the AC rotary machine 1b is installed in a place more likely to be heated than that of the control device 106b for an AC rotary machine. In addition, the AC rotary machine 1b is used under an operating condition that causes a large amount of continuous current to flow.

With the configuration described above, the AC rotary machine can be rotated smoothly by applying a voltage to the AC rotary machine 1b based on the estimated resistance value calculated by the resistance value estimation unit 10. Therefore, it is possible to obtain an electric power steering system that can enable smooth steering.

INDUSTRIAL APPLICABILITY

The control device for an AC rotary machine according to the present invention can be applied to AC rotary machines to be used in various fields.

REFERENCE SIGNS LIST 1, 1b AC rotary machine, 2 current detection unit, 3 inverter, 3a inverter board, 4a, 4b coordinate transformer, 6 adaptive observer, 7 integrator, 8 current controller, 9 temperature detection unit, 10 resistance value estimation unit, 11, 11b instruction generation unit, 12a, 12b, 12c, 13 temperature measurement point, 20 adder, 21 voltage instruction calculation unit, 22 correction voltage calculation unit, 23 load apparatus, 101 steering wheel, 102 torque detector, 103 steering shaft, 104 wheel, 105 rack and pinion gear, 106, 106b control device for AC rotary machine, AD1, AD2 adder, MU multiplier

The invention claimed is:

1. A controller for an AC rotary machine, which is configured to control the AC rotary machine based on an estimated resistance value of the AC rotary machine, the controller comprising:
a temperature detector configured to detect an external temperature of the AC rotary machine, and to output the detected external temperature;
a resistance value estimator to estimate, based on the detected external temperature, an actual resistance value of the AC rotary machine, which changes depending on temperature of the AC rotary machine, and to output the estimated resistance value; and
a voltage supply configured to apply a voltage to an AC rotary machine based on the estimated resistance value,
wherein the resistance value estimator calculates a basic estimated resistance value, which is a sum of a first resistance value defined as a fixed value and a second resistance value that is proportional to the detected external temperature, and to calculate the estimated resistance value by adding an estimated resistance correction value to the basic estimated resistance value,
wherein the estimated resistance correction value comprises a negative value having an absolute value that is larger than a difference between a lower limit value of a resistance value error allowable range and a deviation estimate, and is smaller than an absolute value of the deviation estimate,
wherein the deviation estimate is a value set in advance as a lower limit of a range that is taken by a deviation obtained by subtracting the basic estimated resistance value from the actual resistance value, and
wherein the resistance value error allowable range comprises a range of a resistance value error that enables the AC rotary machine to be rotated smoothly.

2. The controller for an AC rotary machine according to claim 1, wherein the deviation estimate comprises a value that is based on a detection temperature for estimating the deviation, the detection temperature being obtained by extracting one or a plurality of points from a range that is taken by the detected external temperature.

3. The controller for an AC rotary machine according to claim 2, wherein the deviation estimate is based on a range of an individual difference of the actual resistance value.

4. The controller for an AC rotary machine according to claim 2, further comprising:
a calculator to calculate a phase of an alternating voltage of the AC rotary machine and voltages on two rotation axes of the AC rotary machine, which are based on the estimated resistance value; and
a current supply to apply the alternating voltage to the AC rotary machine based on the phase and the voltages on the two rotation axes.

5. The controller for an AC rotary machine according to claim 2, wherein the deviation estimate is based on an upper limit or lower limit of a rotary machine temperature range for the deviation estimate, which is a range of temperature that is taken by temperature of the AC rotary machine at the detection temperature for estimating the deviation.

6. The controller for an AC rotary machine according to claim 5, wherein the deviation estimate is based on a range of an individual difference of the actual resistance value.

7. The controller for an AC rotary machine according to claim 5, further comprising:
a calculator configured to calculate a phase of an alternating voltage of the AC rotary machine and voltages on two rotation axes of the AC rotary machine, which are based on the estimated resistance value; and
a current supply to apply the alternating voltage to the AC rotary machine based on the phase and the voltages on the two rotation axes.

8. The controller for an AC rotary machine according to claim 1, wherein the deviation estimate is based on a range of an individual difference of the actual resistance value.

9. The controller for an AC rotary machine according to claim 1, further comprising:
a calculator to calculate a phase of an alternating voltage of the AC rotary machine and voltages on two rotation axes of the AC rotary machine, which are based on the estimated resistance value; and
a current supply to apply the alternating voltage to the AC rotary machine based on the phase and the voltages on the two rotation axes.

10. An electric power steering system, comprising the controller for the AC rotary machine of claim 1, configured to generate a torque to be transmitted to a steering shaft.

11. A controller for an AC rotary machine, which is configured to control the AC rotary machine based on an estimated resistance value of the AC rotary machine, the controller comprising:
a temperature detector configured to detect an external temperature of the AC rotary machine, and to output the detected external temperature; and
a resistance value estimator to estimate, based on the detected external temperature, an actual resistance value of the AC rotary machine, which changes depending on temperature of the AC rotary machine, and to output the estimated resistance value; and
a voltage supply configured to apply a voltage to an AC rotary machine based on the estimated resistance value,
wherein the resistance value estimator calculates a basic estimated resistance value, which is a sum of a first resistance value defined as a fixed value and a second resistance value that is proportional to the detected external temperature, and to calculate the estimated resistance value by adding an estimated resistance correction value to the basic estimated resistance value,
wherein the estimated resistance correction value is a positive value having an absolute value that is larger than a difference between an upper limit value of a resistance value error allowable range and a deviation estimate, and is smaller than an absolute value of the deviation estimate,
wherein the deviation estimate comprises a value set in advance as an upper limit of a range that is taken by a deviation obtained by subtracting the basic estimated resistance value from the actual resistance value, and
wherein the resistance value error allowable range comprises a range of a resistance value error that enables the AC rotary machine to be rotated smoothly.

12. The controller for an AC rotary machine according to claim 11, wherein the deviation estimate comprises a value that is based on a detection temperature for estimating the deviation, the detection temperature being obtained by extracting one or a plurality of points from a range that is taken by the detected external temperature.

13. The controller for an AC rotary machine according to claim 12, wherein the deviation estimate is based on a range of an individual difference of the actual resistance value.

14. The controller for an AC rotary machine according to claim 12, further comprising:
a calculator to calculate a phase of an alternating voltage of the AC rotary machine and voltages on two rotation axes of the AC rotary machine, which are based on the estimated resistance value; and a current supply to apply the alternating voltage to the AC rotary machine based on the phase and the voltages on the two rotation axes.

15. The controller for an AC rotary machine according to claim 12, wherein the deviation estimate is based on an upper limit or lower limit of a rotary machine temperature range for the deviation estimate, which is a range of temperature that is taken by temperature of the AC rotary machine at the detection temperature for estimating the deviation.

16. The controller for an AC rotary machine according to claim 15, wherein the deviation estimate is based on a range of an individual difference of the actual resistance value.

17. The controller for an AC rotary machine according to claim 15, further comprising:

a calculator to calculate a phase of an alternating voltage of the AC rotary machine and voltages on two rotation axes of the AC rotary machine, which are based on the estimated resistance value; and a current supply configured to apply the alternating voltage to the AC rotary machine based on the phase and the voltages on the two rotation axes.

18. The controller for an AC rotary machine according to claim 11, wherein the deviation estimate is based on a range of an individual difference of the actual resistance value.

19. The controller for an AC rotary machine according to claim 11, further comprising:

a calculator to calculate a phase of an alternating voltage of the AC rotary machine and voltages on two rotation axes of the AC rotary machine, which are based on the estimated resistance value; and a current supply to apply the alternating voltage to the AC rotary machine based on the phase and the voltages on the two rotation axes.

20. An electric power steering system, comprising the controller for the AC rotary machine of claim 11, configured to generate a torque to be transmitted to a steering shaft.

* * * * *